United States Patent
Sartore et al.

(10) Patent No.: US 10,216,685 B1
(45) Date of Patent: Feb. 26, 2019

(54) MEMORY MODULES WITH NONVOLATILE STORAGE AND RAPID, SUSTAINED TRANSFER RATES

(71) Applicant: AgigA Tech Inc., San Diego, CA (US)

(72) Inventors: Ronald H Sartore, Valley Center, CA (US); Thomas O. Koger, San Diego, CA (US)

(73) Assignee: AgigA Tech Inc., San Diego, CA (US)

( * ) Notice: Subject to any disclaimer, the term of this patent is extended or adjusted under 35 U.S.C. 154(b) by 0 days.

(21) Appl. No.: 15/834,490

(22) Filed: Dec. 7, 2017

Related U.S. Application Data

(60) Provisional application No. 62/534,597, filed on Jul. 19, 2017.

(51) Int. Cl.
| | |
|---|---|
| *G06F 13/42* | (2006.01) |
| *G06F 13/364* | (2006.01) |
| *G06F 12/0802* | (2016.01) |
| *G06F 12/1009* | (2016.01) |
| *G06F 3/06* | (2006.01) |

(52) U.S. Cl.
CPC .......... *G06F 13/4234* (2013.01); *G06F 3/065* (2013.01); *G06F 3/0613* (2013.01); *G06F 3/0619* (2013.01); *G06F 3/0647* (2013.01); *G06F 3/0688* (2013.01); *G06F 12/0802* (2013.01); *G06F 12/1009* (2013.01); *G06F 13/364* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 5,148,389 | A | * | 9/1992 | Hughes ............... G06F 12/0676 710/104 |
| 5,357,621 | A | * | 10/1994 | Cox .................... G06F 12/0669 711/172 |
| 5,918,029 | A | | 6/1999 | Metzger |
| 6,047,350 | A | | 4/2000 | Dutton |
| 6,077,306 | A | * | 6/2000 | Metzger ............. G06F 13/4068 703/21 |
| 6,134,632 | A | | 10/2000 | Looi |
| 7,266,664 | B2 | | 9/2007 | Higuchi |
| 7,496,777 | B2 | * | 2/2009 | Kapil ..................... G06F 1/3203 713/324 |
| 7,814,241 | B2 | * | 10/2010 | Honda .................. G06F 3/0607 710/38 |
| 9,779,016 | B1 | * | 10/2017 | Shen ......................... G06F 1/30 |
| 9,817,610 | B1 | * | 11/2017 | Shallal .................... G06F 11/14 |
| 9,940,980 | B2 | * | 4/2018 | Lee ......................... G06F 3/061 |

(Continued)

*Primary Examiner* — Midys Rojas
*Assistant Examiner* — Khoa D Doan
(74) *Attorney, Agent, or Firm* — FSP LLC

(57) ABSTRACT

A memory module is organized into slice sections, each configured to input and output a slice of data for a different section of a data bus. Each slice section includes at least one nonvolatile memory (NVM) and a memory element, such as random access volatile memory, to store the slice of data for the slice section during operations that transfer the slice of data between the section of the data bus for the slice section and the NVM of the slice section. Each slice section also includes a slice controller configured to translate an address for the slice of data for the section of the data bus into a physical address of the NVM of the slice section.

17 Claims, 15 Drawing Sheets

(56) References Cited

U.S. PATENT DOCUMENTS

| | | | |
|---|---|---|---|
| 9,946,470 B2 * | 4/2018 | Shallal | G06F 3/065 |
| 10,152,237 B2 * | 12/2018 | Walker | G06F 3/0679 |
| 2002/0124129 A1 * | 9/2002 | Zilberman | G06F 13/1673 |
| | | | 711/103 |
| 2003/0156454 A1 * | 8/2003 | Wei | G11C 7/1006 |
| | | | 365/185.17 |
| 2005/0055481 A1 * | 3/2005 | Chou | G06F 13/387 |
| | | | 710/52 |
| 2005/0071580 A1 * | 3/2005 | LeClerg | G11C 29/26 |
| | | | 711/154 |
| 2005/0278495 A1 * | 12/2005 | Lee | G06F 13/4243 |
| | | | 711/168 |
| 2006/0095671 A1 * | 5/2006 | Gower | G06F 12/0802 |
| | | | 711/118 |
| 2006/0195631 A1 * | 8/2006 | Rajamani | G06F 13/1684 |
| | | | 710/51 |
| 2007/0101087 A1 * | 5/2007 | Gregorius | G06F 13/4256 |
| | | | 711/167 |
| 2008/0049505 A1 * | 2/2008 | Kim | G06F 13/1694 |
| | | | 365/185.11 |
| 2008/0140724 A1 * | 6/2008 | Flynn | G06F 3/0613 |
| 2008/0140899 A1 * | 6/2008 | Oh | G06F 12/0653 |
| | | | 710/300 |
| 2008/0140916 A1 * | 6/2008 | Oh | G06F 13/4239 |
| | | | 711/103 |
| 2008/0147932 A1 * | 6/2008 | Fukazawa | G06F 11/2089 |
| | | | 710/74 |
| 2008/0155207 A1 * | 6/2008 | Eilert | G06F 13/4243 |
| | | | 711/154 |
| 2008/0177923 A1 * | 7/2008 | Klein | G06F 13/1673 |
| | | | 710/306 |
| 2008/0181021 A1 * | 7/2008 | Thayer | G11C 5/066 |
| | | | 365/189.02 |
| 2008/0198682 A1 * | 8/2008 | Pyeon | G11C 19/00 |
| | | | 365/230.06 |
| 2008/0201548 A1 * | 8/2008 | Przybylski | G06F 13/4243 |
| | | | 711/171 |
| 2008/0320191 A1 * | 12/2008 | Bravo | G06F 13/1684 |
| | | | 710/107 |
| 2009/0024819 A1 * | 1/2009 | Fisher | G06F 12/0897 |
| | | | 711/170 |
| 2009/0043946 A1 * | 2/2009 | Webb | G06F 13/4256 |
| | | | 711/102 |
| 2009/0125671 A1 * | 5/2009 | Flynn | G06F 9/52 |
| | | | 711/103 |
| 2009/0287956 A1 * | 11/2009 | Flynn | G06F 11/1008 |
| | | | 714/6.12 |
| 2010/0005366 A1 * | 1/2010 | Dell | G06F 11/073 |
| | | | 714/758 |
| 2010/0091536 A1 * | 4/2010 | Kim | G11C 5/02 |
| | | | 365/51 |
| 2010/0162037 A1 * | 6/2010 | Maule | G06F 11/106 |
| | | | 714/5.11 |
| 2010/0211737 A1 * | 8/2010 | Flynn | G06F 3/0616 |
| | | | 711/114 |
| 2012/0079352 A1 * | 3/2012 | Frost | G06F 11/1008 |
| | | | 714/767 |
| 2012/0131253 A1 * | 5/2012 | McKnight | G06F 1/30 |
| | | | 710/308 |
| 2012/0260024 A1 * | 10/2012 | Haywood | G06F 13/1642 |
| | | | 711/103 |
| 2013/0086452 A1 | 4/2013 | Grube | |
| 2013/0138862 A1 | 5/2013 | Motwani | |
| 2013/0138970 A1 | 5/2013 | Resch | |
| 2014/0013041 A1 * | 1/2014 | Gillingham | G06F 13/4243 |
| | | | 711/103 |
| 2015/0255130 A1 * | 9/2015 | Lee | G06F 13/382 |
| | | | 711/103 |
| 2015/0279463 A1 * | 10/2015 | Berke | G11C 5/04 |
| | | | 711/105 |
| 2015/0364218 A1 | 12/2015 | Frayer | |
| 2016/0110290 A1 * | 4/2016 | Chen | G06F 12/0868 |
| | | | 710/313 |
| 2016/0118121 A1 * | 4/2016 | Kelly | G06F 13/4068 |
| | | | 710/301 |
| 2016/0342487 A1 * | 11/2016 | Ware | G11C 7/20 |
| 2017/0168931 A1 * | 6/2017 | Kim | G06F 12/0895 |
| 2017/0212835 A1 * | 7/2017 | Hu | G06F 12/0246 |
| 2017/0235522 A1 * | 8/2017 | Kim | G06F 3/0619 |
| | | | 714/773 |
| 2018/0005670 A1 * | 1/2018 | Lee | G06F 3/061 |
| 2018/0292991 A1 * | 10/2018 | Walker | G06F 3/0604 |
| 2018/0293012 A1 * | 10/2018 | Khatri | G06F 3/0629 |
| 2018/0329651 A1 * | 11/2018 | Chang | G06F 3/0659 |
| 2018/0349225 A1 * | 12/2018 | Bishnoi | G06F 11/1441 |

* cited by examiner

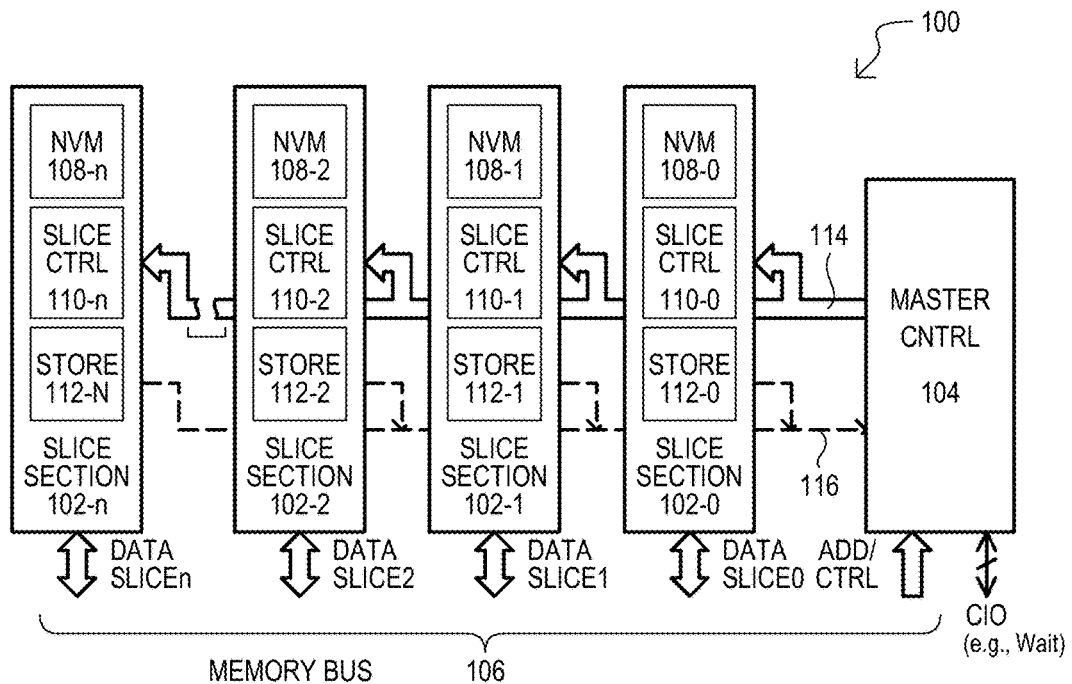
FIG. 1
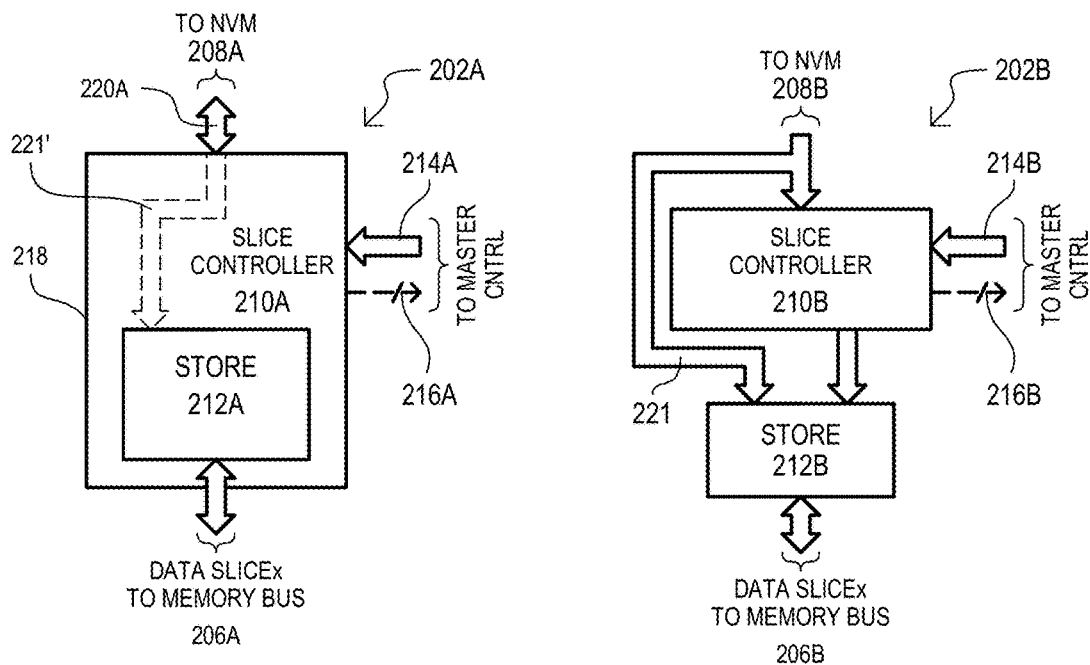
FIG. 2A
FIG. 2B

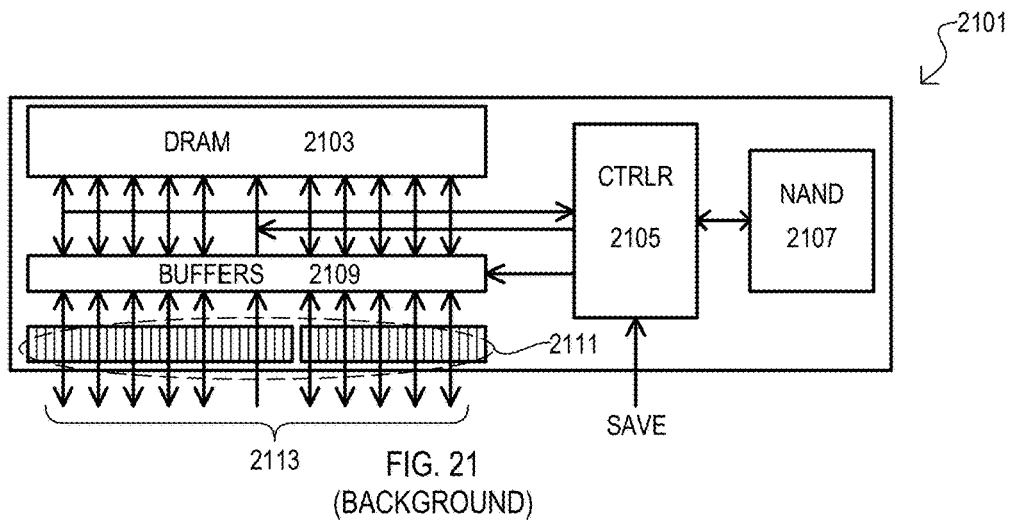
FIG. 21 (BACKGROUND)
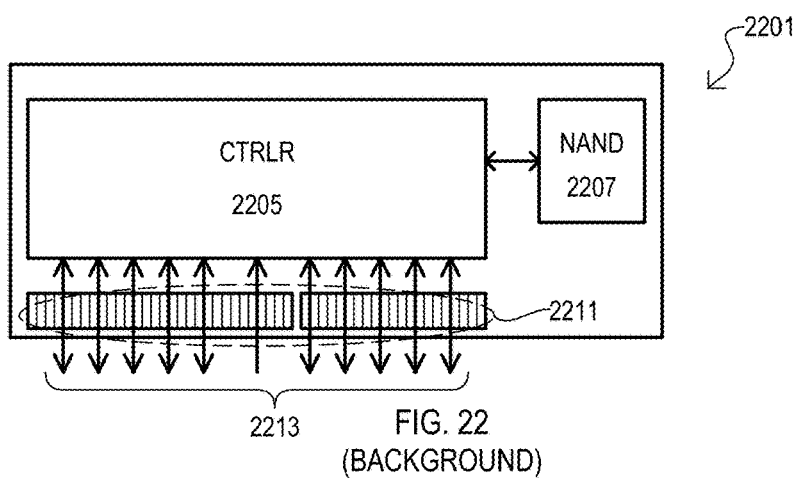
FIG. 22 (BACKGROUND)
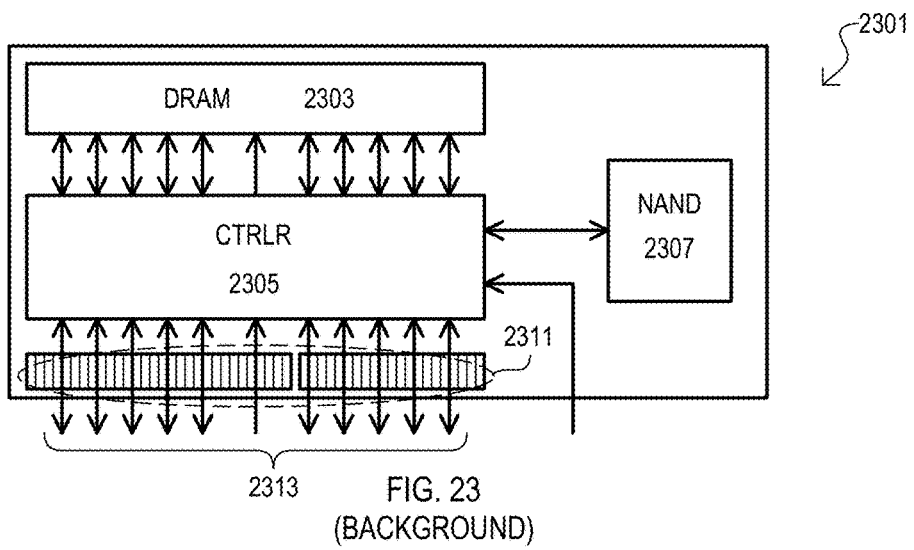
FIG. 23 (BACKGROUND)

MEMORY MODULES WITH NONVOLATILE STORAGE AND RAPID, SUSTAINED TRANSFER RATES

This application claims the benefit of U.S. provisional patent application Ser. No. 62/534,597, filed on Jul. 19, 2017, the contents of which are incorporated by reference herein.

TECHNICAL FIELD

The present disclosure relates generally to memory modules having nonvolatile storage, and more particularly to memory modules that can provide for sustained, rapid data transfer rates.

BACKGROUND

Memory modules can include system components that attach to a memory bus. A memory module ubiquitous to most modern computer systems is the dual in-line memory module (DIMM). A conventional DIMM is populated with dynamic random access memory (DRAM) integrated circuits devices, for rapid access by a host through the use of a memory controller, and relatively low power consumption.

The need to preserve system RAM data has given rise to "image" type non-volatile DIMMs (NVDIMMs). A conventional image type NVDIMM is shown in FIG. 21. FIG. 21 shows one version of an NVDIMM according to the NVDIMM-N standard (JESD248) promulgated by JEDEC. A conventional NVDIMM 2101 can include DRAM 2103, as in a conventional DIMM, but can further include a controller 2105, NAND type flash memory 2107, and buffers 2109. The NVDIMM 2101 can include DIMM compatible connectors 2111 and can communicate via a CAS-RAS interface/protocol 2113. In standard operations, the DRAM of the NVDIMM can be accessed like a conventional DIMM. However, in response to certain system events (e.g., power loss, reset, or special command), the data stored in the DRAM can be written into the NAND storage (e.g., SAVE). Conversely, in response to other system events (e.g., power-on, reset, or other special command), the data stored in the NAND memory can be transferred back into the DRAM. Such data can then be accessible by a host, through access to the DRAM 2103.

While an image type NVDIMM, like that of FIG. 21, can provide a valuable feature to systems, such an architecture may be less suitable for other applications. For example, there is a desire to place even larger amounts of nonvolatile storage on memory modules. However, mirroring such large data amounts with DRAM would be extremely impractical. Accordingly, there is a desire to place very large, block-mode accessed nonvolatile memories onto the high-speed, multi-byte-wide, byte-addressable memory channel. The conventional approach to implement this is to provide a large controller which then steers all of the wide memory channel data to one or more nonvolatile memory channels.

FIG. 22 shows one proposed version of an NVDIMM according to a standard developed by JEDEC (NVDIMM-F standard). The NVDIMM 2201 does not include DRAM, and instead employs a larger controller 2205 with NAND 2207 storage. Being DIMM compatible, proposed NVDIMM 2201 also includes DIMM type connectors 2211 and can communicate via a CAS-RAS interface/protocol 2213. A drawback to such an approach can be the difference between bus access speeds and NAND access speeds, particularly during sustained accesses. As bus access speeds (e.g., DRAM speeds) outstrip NAND access speeds, large transfers between the NAND and controller can become a bottleneck. Another drawback can be the complexity and expense of implementing such a large controller device. Further, signaling at the interface of the controller can involve massive input/output (I/O) switching, which may be difficult to source or sink by a single integrated circuit.

FIG. 23 shows another version of an NVDIMM according to a standard currently under development by JEDEC (proposed NVDIMM-P standard). The proposed NVDIMM 2301 includes DRAM 2303 and NAND 2307 accessible by a large controller 2305. Proposed NVDIMM 2301 also includes DIMM compatible connectors 2311 and communicates via a CAS-RAS interface/protocol 2313. A drawback to an approach like that of FIG. 23 can include those noted above for the example of FIG. 22. In addition, proposed NVDIMM 2301 can have the added cost of including DRAM, as compared to FIG. 22. Further, proposed NVDIMM 2301 presents a significant signal routing challenge, particularly for data buses, which must be routed to/from the bus 2313 to the controller 2305, as well as from the controller 2305 to the DRAM 2303.

BRIEF DESCRIPTION OF THE DRAWINGS

The embodiments disclosed are shown by way of example and not limitation in the described figures. In the described figures, like references indicate similar elements, with the leading digit(s) corresponding to the figure number.

FIG. 1 is a block schematic diagram of a memory module according to an embodiment.

FIGS. 2A to 2D are block diagrams of slice controllers that can be included in embodiments.

FIGS. 21 to 23 are diagrams of conventional NVDIMMs.

DETAILED DESCRIPTION

Figure 2C:
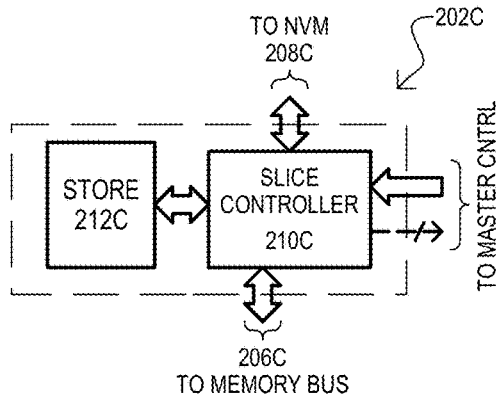

Embodiments described herein show memory modules in which different portions of a total access transfer width of a data bus are stored in dedicated "slice" sections, which can each include nonvolatile memory (NVM). A controller in each slice section can enable rapid transfers of its slice of data between the NVM and a data bus.

In some embodiments, each slice section can include a slice store circuit to store slice data in transit between the NVM and a data bus. A slice store can also cache a portion of the slice data stored in the NVM of the slice section. In very particular embodiments, a slice store can be a multi-port memory, having one data port coupled to the data bus, and another data port coupled to the NVM of the slice section.

In some embodiments, a memory module can include a master controller which can generate a module address which can be applied to all slice sections. The module address can be generated from a memory address received on a memory bus that includes a data bus. In some embodiments, a master controller can maintain a cache arrangement for data slices cached in each slice section. According to an address received from the memory bus, a master controller can generate an address for cache memory resident on each slice section, or for access to the NVM of each slice section.

In some embodiments, a memory module can be compatible with a dual in-line memory module (DIMM) physical slot. In some embodiments, a memory module can include one or more outputs in addition to the standard DIMM I/Os to indicate a state of operations within the memory module (e.g., WAIT), and/or one or more inputs in addition to the standard DIMM I/Os to initiate particular operations within the memory module (e.g., SAVE).

FIG. 1 shows a memory module 100 according to an embodiment. A memory module 100 can include a number of slice sections (102-0 to -n) and a master controller 104. Slice sections (102-0 to -n) and master controller 104 can be connected to a memory bus 106. In particular, each slice section (102-0 to -n) can be connected to receive a different portion of a data bus, DATA SLICE0 to DATA SLICEn, while a master controller 104 can be connected to receive address and control data (ADD/CTRL) of the memory bus 106. Accordingly, each slice section (102-0 to -n) can include a data input/output (I/O) interface (I/F) suitable for the physical signals and transmission protocol of its slice of the data bus. Similarly, a master controller 104 can include a suitable address and control I/F for the memory bus.

A data bus portion of memory bus 106 can have an access transfer width which can be the number of bits transferred over the data bus in a transfer operation, such as a read or write. In some embodiments, an access transfer width can be a number of bits transferred in parallel at essentially the same time. It is understood that data contained in an access transfer width can include read data, write data, as well as any ancillary data, including error detection and/or correction codes for the read or write data. In some embodiments, a memory bus 106 can be a dual data rate (DDR) type memory bus. In very particular embodiments, a memory bus 106 can be compliant with the DDR4 Specification promulgated by JEDEC, or the DDR5 Specification currently under development by JEDEC.

It is noted that a number of slice sections (102-0 to -n) can be a small as two, or a great as one for every bit of data on the memory bus 106. However, in particular embodiments, slice sections (102-0 to -n) can each service a logical division of the larger data value provided on the memory bus 106 (e.g., 8-bit bytes, 16-bit words, 32-bit double words, etc.). In some embodiments, portions of a data bus (DATA SLICE0 to n) received at each slice section (102-0 to -n) can be bi-directional. However, in other embodiments, slice sections (102-0 to -n) can interface with separate read/write data paths for each data slice. In particular embodiments, data values for each slice section (DATA SLICE0 to -n) can be output in synchronism with a data timing signal (e.g., data strobe, DQS). In such configurations, a data timing signal can be output by a master controller 104. However, in alternate embodiments, a data timing signal can be generated by a single slice section in communication with other slice sections.

Slice sections (102-0 to -n) can receive signals from a master controller 104 over a module bus 114. In response to such signal, slice sections can carry out data access operations for each data slice (DATA SLICE0 to -n). In some embodiments, a module bus 114 can carry address and control (e.g., operation type) values to each slice section (102-0 to -n).

Optionally, a memory module 100 can include a slice communication channel 116 for sending information from slice sections (102-0 to -n) to master controller 104. In some embodiments, slice communication channel 116 can be bi-directional, enabling master controller 104 to transmit information to the slice sections (102-0 to -n).

Referring still to FIG. 1, in the particular embodiment shown, each slice section (102-0 to -n) can include NVM 108-0 to -n, a slice controller 110-0 to -n, and a slice store 112-0 to -n. NVM (108-0 to -n) can be any suitable memory type, including but not limited to NAND type flash memory, resistive random access memory (ReRAM), magneto-resistive RAM (MRAM), ferro-electric RAM (FRAM), phase change RAM (PCRAM), or 3D XPoint type memory, to name a few. In some embodiments, NVM (108-0 to -n) can be dedicated to its corresponding slice section, storing data only for that particular slice. For example, in such an arrangement, NVM 108-0 can store data only for DATA SLICE0, NVM 108-1 can store data only for DATA SLICE1, etc. However, in some embodiments, to improve endurance, accommodate wear leveling and/or redundancy, one or more NVMs can be shared among more than one slice section. It is understood that the NVM (108-0 to -n) shown in FIG. 1 can include any number of NVM devices of various forms (packaged ICs, multi-chip modules, NVM arrays with integrated controllers, NVM memory modules, etc.).

A slice controller (110-0 to 110-n) can control data transfer operations for the corresponding slice section (102-0 to 102-n). A slice controller (110-0 to 110-n) can receive address and control data from module bus 114, and in response, execute data transfer operations between the corresponding NVM (108-0 to -n) and data slice (DATA SLICE0 to n). A slice controller (110-0 to 110-n) can translate address values received on module bus 114 into physical addresses for the corresponding NVM (108-0 to -n). In this way, each slice controller (110-0 to 110-n) can maintain a logical to physical addressing mapping particular to its slice section.

In some embodiments, a slice store (112-0 to -n) can serve as a slice cache for data stored in the NVM (108-0 to -n) of the slice section. In such cases, a slice controller (110-0 to 110-n) can generate physical address values for a slice store (112-0 to -n) to enable access to cached locations, as well as physical addresses for NVM (108-0 to -n) corresponding to non-cached locations. Cache hit determinations can be made in any suitable fashion. In some embodiments, cache hit determinations can be made by a master controller 104. In such arrangements, address values received at each slice section (102-0 to -n) can inherently indicate a cache hit or miss for the slice section. However, in other embodiments, each slice controller (110-0 to 110-n) can perform a cache hit operation local to the slice section (102-0 to -n).

According to embodiments, a slice controller (110-0 to 110-n) can also perform "housekeeping" operations for the corresponding NVM (108-0 to -n). Housekeeping operations can include operations specific to the NVM (108-0 to -n) to maintain a desired performance of the NVM. Housekeeping operations can include, but are not limited to: maintaining a status of NVM portions (e.g., block dirty, ready, bad, protected, etc.), executing wear leveling operations, executing "healing" operations, or executing conditioning operations. Healing operations can be operations which can recover NVM memory cells that are not operating properly. While healing can take any suitable form according to the NVM type, in some embodiments healing can include heating, cooling, or applying program or erase voltages/currents/time different than those used during standard NVM access operations. Conditioning operations can narrow a distribution of NVM cell properties (e.g., threshold voltage, resistance, etc.), and can also take any form suitable to the NVM type. In particular operations, conditioning can include executing extra programming and/or erase operations and different tolerances (e.g., verify levels) and/or voltages/currents/times.

A slice controller (110-0 to -n) can also perform other operations apart from memory accesses and maintenance. As but one example, a slice controller (110-0 to -n) can execute special operations for an interface with its particular portion of the memory bus 106. As but one example, in response to signals from master controller 104, a slice controller (110-0 to -n) can enter a "training" mode, and output predetermined data values to enable a bus controller (e.g., memory controller) to optimize transmission/termination settings for the memory bus 106. However, in embodiments operating according to different standard/protocols, a slice controller (110-0 to -n) can optimize drivers and/or impedance terminations for its slice section (102-0 to -n).

A slice store (112-0 to -n) can store data in transit between the corresponding NVM and data slice. For example, slice store 112-0 can store data in transit between NVM 108-0 and DATA SLICE0, slice store 112-1 can store data in transit between NVM 108-1 and DATA SLICE1, etc. A slice store (112-0 to -n) can have a faster data access speed than NVM (108-0 to -n). In some embodiments, a slice store (112-0 to -n) can be a memory.

In particular embodiments, a slice store (112-0 to -n) can be a multi-port memory. For example, a slice store (112-0 to -n) can be at least a dual-port memory, where one port can transfer data between the slice store (112-0 to -n) and the corresponding portion of the data bus (DATA SLICE0 to -n), while the other port can transfer data between the slice store (112-0 to -n) and the corresponding NVM (108-0 to -n).

While embodiments include slice stores (112-0 to -n) that are multi-port memories, in other embodiments, a slice store (112-0 to -n) can be a single port memory. In some embodiments, a slice store (112-0 to -n) can be a single port memory with a faster access speed than accesses performed over the memory bus 106.

A slice store (112-0 to -n) can include any suitable storage circuits, including memory circuits or registers. However, in particular embodiments a slice store can include static RAM (SRAM) and/or DRAM.

As noted above, in some embodiments a slice store (112-0 to -n) can serve as a cache memory for a portion of the data store in the corresponding NVM (108-0 to -n). In such arrangements, a slice store (112-0 to -n) can be of sufficient size to match the data access granularity of the corresponding NVM (108-0 to -n). For example, NVM (108-0 to -n) may access data according to a particular grouping (e.g., pages). A corresponding slice store (112-0 to -n) may be of sufficient size to store at least one, or preferably more than one such grouping of data (e.g., store multiple pages).

As will be described in more detail below, the various members of a slice section (NVM (108-0 to -n), slice controller (110-0 to -n), slice store (112-0 to -n)) can take the form of separate components, or integrated components. For example, any of the members can be in separate IC packages, two of the members can be one IC package, or all three members can be in the same IC package.

Referring still to FIG. 1, a master controller 104 can receive address and control values ADD/CTRL from memory bus 106, and in response, generate signals on module bus 114 for each slice section (102-0 to -n). In some embodiments, signals on module bus 114 can be common for all slice sections slice sections (102-0 to -n). However, in other embodiments, a master controller 104 can provide signals unique to one or more slice sections (102-0 to -n). Optionally, master controller 104 can receive signals from and/or provide additional signals to slice sections (102-0 to -n) via slice communication channel 116.

According to embodiments, a master controller 104 can receive and/or output one or more additional signals (controller input and/or output (CIO)). In very particular embodiments, signal(s) CIO can include any of: a "Wait" signal or a "Save" signal. A Wait signal can be a signal output from master controller 104 that can indicate when operations on a memory bus 106, or a data bus of the memory bus 106 should be suspended. As will be noted below, such a Wait signal can be generated based on status information of each slice section (102-0 to -n). A Save signal can be a signal received by master controller 104 that can indicate all or a portion of the data within the slice stores (112-0 to -n) is to be stored (e.g., backed up) in the corresponding NVM (108-0 to -n). In some embodiments, signals CIO can be "out of band" signals, that are not included in the standard/protocol for memory bus 106 (e.g., not part of address or control signals). However, in other embodiments, signals CIO can be implemented by special memory commands, or special data output signals.

As noted herein, in some embodiments, a master controller 104 can perform address translations, translating a system memory address received over memory bus 106 into module address value sent over module bus 114. Further, such address translations can include determining cache hits. A master controller 104 can also translate special control signals over module bus 114 for operations apart from memory accesses to the slice sections (102-0 to -n). As but one example, in response to predetermined ADD/CTRL signals, master controller 104 can place slice sections (102-0 to -n) into a "training" mode noted above.

FIG. 2A shows a slice section 202A according to one embodiment. In particular embodiments, slice section 202A can be one implementation of any of those shown as 102-0 to -n in FIG. 1.

A slice section 202A can include an integrated slice controller/store 218 and NVM 208A (not shown). An integrated controller/store 218 can include a slice controller 210A and slice store 212A integrated into the same device 218. Integrated controller/store 218 can take any suitable form, including but not limited to a single integrated circuit in which slice store 212A is a memory embedded into slice controller 210A, or different integrated circuits included in a same integrated circuit package.

Within integrated controller/store 218, slice controller 210A can be connected to NVM 208A via an NVM bus 220A, and can receive address (and control) values over module bus 214A. Optionally, slice controller 210A can transmit and/or receive additional signals via slice communication channel 216A. It is understood module bus 214A and slice communication channel 216A can be commonly connected to all other slice sections. It is noted that in some embodiments, a slice controller 210A can include a data path 221' that connects NVM bus 220A directly to slice store 212A.

Slice store 212A can be connected to a portion of a data bus DATA SLICEx (which is part of a larger memory bus 206A). Thus, data can be transmitted between the memory bus 206A and slice store 212A. In particular embodiments, data can be transmitted directly between memory bus 206 and slice store 212A.

FIG. 2B shows a slice section 202B according to another embodiment. In particular embodiments, slice section 202B can be one implementation of any of those shown as 102-0 to -n in FIG. 1.

A slice section 202B can include the same general components of that shown in FIG. 2A, and such components can be the same as, or equivalents of those shown FIG. 2A. FIG. 2B differs from FIG. 2A in that a slice controller 210B is not integrated with a slice store 212B. Accordingly, a slice controller 210B and slice store 212B can be separate integrated circuit packages mounted in the same memory module. FIG. 2B also shows how a slice controller 210B can include a connection 221 between NVM bus 220B and slice store 212B.

FIG. 2C shows a slice section 202C according to a further embodiment. Slice section 202C can be one implementation of any of those shown as 102-0 to -n in FIG. 1. Slice section 202C can differ from those of FIGS. 2A and 2B in that a bus portion (DATA SLICEx) can interface with slice controller 210C. As but one example, a slice controller 210C can include a physical interface for a portion of a memory bus. In addition, a slice controller 210C can include any of various data transfer paths: between NVM 208C and slice store 212C; between NVM 208C and bus portion DATA SLICEx; and/or between slice store 212C and bus portion DATA SLICEx.

Figure 2D:
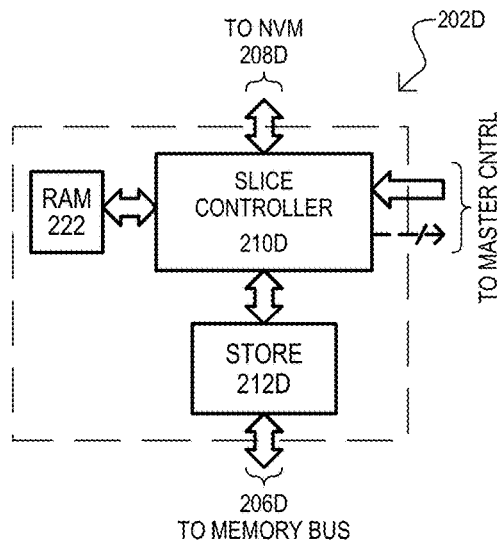

FIG. 2D shows a slice section 202D according to another embodiment. Slice section 202D can be one implementation of any of those shown as 102-0 to -n in FIG. 1. Slice section 202D can have a configuration like that of FIG. 2B, but further include a controller memory 222. A controller memory 222 can be accessed by slice controller 210D as it executes various functions. As but one example, a controller memory 222 can be a RAM accessible by processing circuits within slice controller 210D. In some embodiments, a controller memory 222 can store mapping and/or status data for NVM 208D. Further, a controller memory 222 can be a volatile memory, and in certain operations (e.g., SAVE), its data can be stored in NVM 208D.

Figure 3:
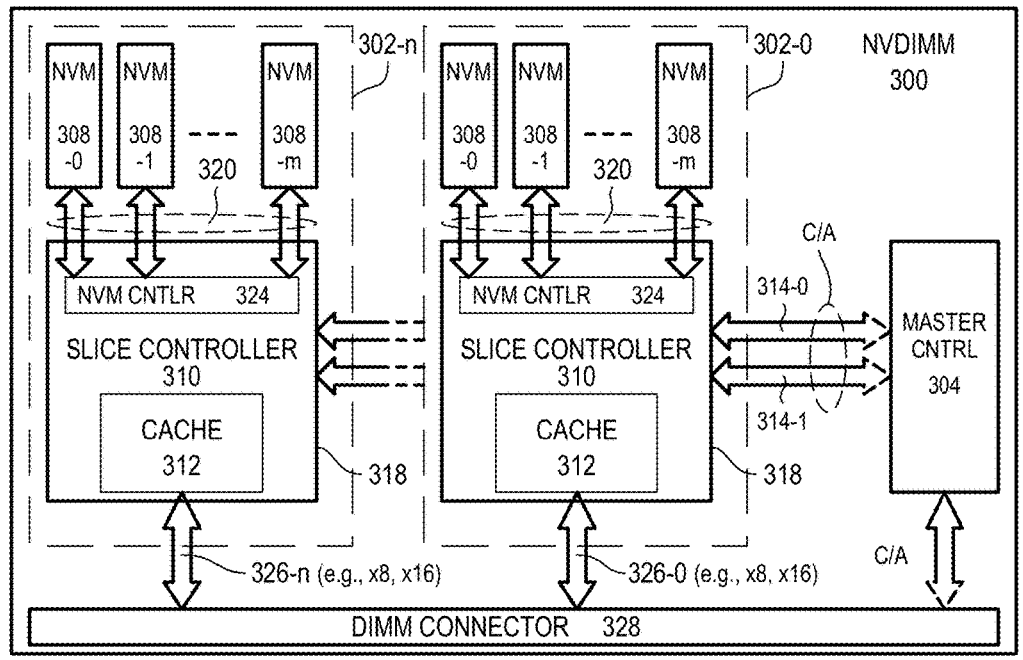
FIG. 3 is a block schematic diagram of a nonvolatile, dual in-line memory module (NVDIMM) according to a particular embodiment.

FIG. 3 is a diagram showing a memory module 300 according to another embodiment. A memory module 300 can be one particular implementation of that shown in FIG. 1. In the embodiments, memory module 300 can be nonvolatile DIMM (NVDIMM), which can be inserted into a DIMM slot of a system. The memory module 300 can include a number of slice sections 302-0 to -n and a master controller 304 connected to a DIMM connector 328.

A master controller 304 can receive control and address data (C/A, e.g., command and address data in DRAM compatible interfaces) from DIMM connector 328. In response, master controller 304 can provide control and address data on module bus 314-0/1. As noted herein, a master controller 304 can execute address translation as well as cache hit determinations on received address values.

Slice sections (302-0 to -n) can each be connected to DIMM connector 328 by a corresponding data routing 326-0. It is understood that each data routing (326-0 to -n) routes a smaller portion of a larger data word (i.e., a slice) to the slice section (302-0 to -n). Each slice section (302-0 to -n) can include a slice controller 310, a slice store 312, also called a cache 312, which operates as a slice cache memory, NVM control section 324, and NVM (308-0 to -m). Each cache 312 can cache a portion of the data stored in the NVM (308-0 to -m) of the same slice section (302-0 to -n), as described herein, or equivalents.

Each slice controller 310 can execute any of the various slice controller functions described herein, or equivalents. Each NVM control section 324 can be controlled by the slice controller 310 to enable memory accesses to NVM (308-0 to -m) of the slice section. In some embodiments, each slice section (302-0 to -n) can access its corresponding NVM through multiple NVM channels 320. However, alternate embodiments can include a single NVM channel.

In the particular embodiment shown, slice controller 310, cache 312 and NVM control section 324 can all be part of a same multi-chip package 318. However, as noted herein, alternate embodiments can include various other physical division of components.

Figure 4:
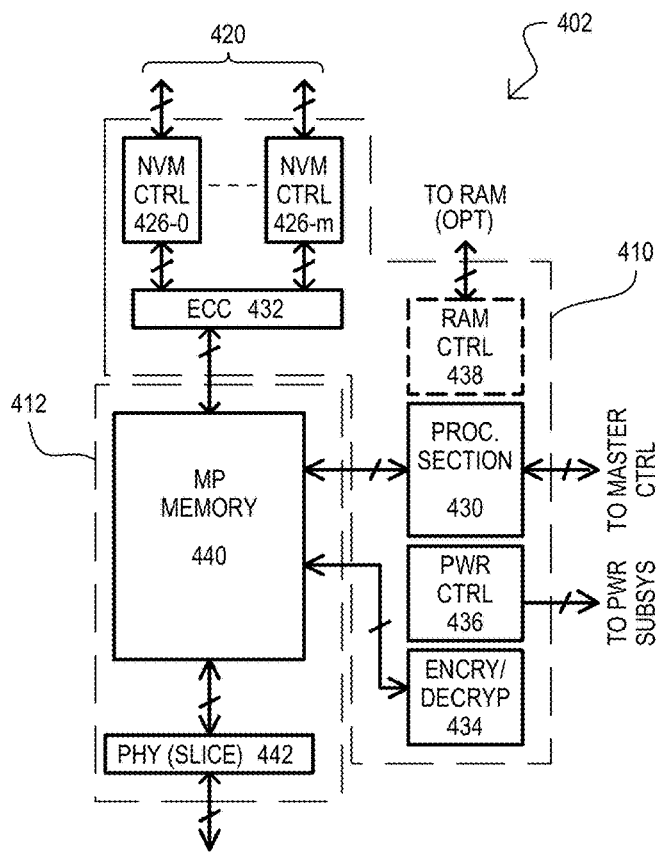
FIG. 4 is a block schematic diagram of another slice section that can be included in embodiments.

FIG. 4 is block diagram of a slice section 402 according to another embodiment. A slice section 402 can be one implementation of any of those shown in FIGS. 1-3. Slice section 402 can include a slice controller 410 and slice store 412. A slice controller 410 can include a processor section 430, NVM controllers (426-0 to -m), error detection and correction (ECC) circuits 432, power control circuits 436 and encryption/decryption circuits 434. Processor section 430 can include processor circuits for executing the various operations of a slice controller 410 described for various embodiments herein, including data transfer operations and NVM maintenance operations. A processor section 430 can be multi-cored or single cored, with processors that execute machine readable instructions. A processor section 430 can be connected to receive address and control values from a master controller. In some embodiments, such values can be passed through to slice store 412. However, in other embodiments, a processor section 430 can perform address translation and/or cache hit determinations, or any other function.

NVM controllers (426-0 to -m) can each control access to one of multiple NVM channels 420, with one or more NVM devices residing on each channel. In particular, NVM controllers (426-0 to -m), by operation of processor section 430 can transfer data between NVM devices and slice store 412.

ECC circuits 432 can execute error correction and detection operations on data received from NVM controllers (426-0 to -*m*). Such ECC operations can occur according to any suitable method. In particular embodiments, ECC circuits 432 can receive ECC codes with data from NVM controller (426-0 to -*m*) and from such data and ECC code, generate error corrected data for output to slice store 412. Conversely, ECC circuits 432 can generate ECC codes for data programmed into NVM by NVM controllers (426-0 to -*m*). It is noted that in other embodiments, ECC circuits can be resident on NVM devices (not shown) attached to the NVM channels 420, and NVM controller (426-0 to -*m*) can perform no, or very limited ECC operations.

Power control circuits 436 can control power operations for the slice section 402 and/or memory module on which the slice section is located. In some embodiments, power control circuits 436 can control power to a slice section 402. As but one example, power control circuits 436 can enable back-up power to be switched to components of slice section 402 in response to predetermined events (loss of power, power-on reset, a save command, etc.).

Encryption/decryption circuits 434 can encrypt data input to the slice section 402 for storage. Such encryption can occur as slice data are stored in slice store 412 from a portion of a memory bus and/or as data are programmed into NVM from slice store 412. Such decryption can occur as slice data are read from slice store 412 onto a portion of a memory bus and/or as data are read from NVM into slice store 412.

Optionally, a slice controller 410 can include an additional memory controller 438, which can enable processor section 430 to use other memory when performing its various functions. In particular embodiments, memory controller 438 can be a controller for a volatile memory such as DRAM or SRAM.

A slice store 412 can include a multi-port memory 440 and physical interface PHY circuits 442 for a portion of a memory bus. A multi-port memory 440 can be at least a two-port memory that enables access by NVM controllers (426-0 to -*m*) and/or processor section concurrently with accesses via PHY circuits 442.

Figure 5:
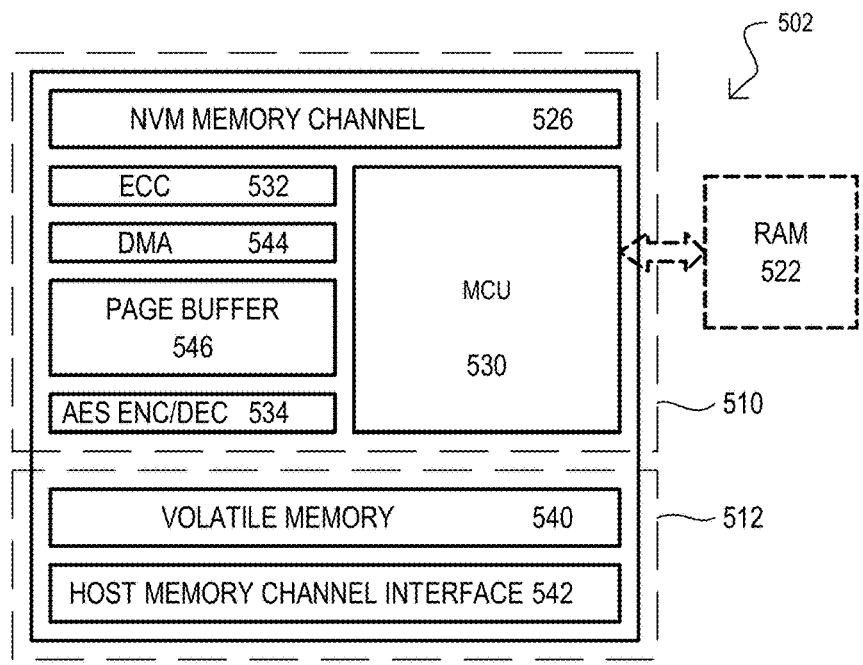
FIG. 5 is a block diagram of a slice section that can be included in embodiments.

FIG. 5 illustrates a slice section 502 in accordance with one embodiment. A slice section 502 can be one implementation of those shown herein. The slice section 502 can include a slice controller 510 and slice store 512. A slice controller 510 can include a NVM channel controller 526, ECC circuits 532, direct memory access (DMA) circuits 544, a page buffer 546, encryption/decryption circuits 534, and processor circuits 530. NVM channel controller 526 can manage the transfer of data over one or more non-volatile memory channels, as described herein, or equivalents.

In the particular embodiment shown, processor circuits 530 can include a microcontroller (MCU). However, in alternate embodiments, other types of processors can be included. Processor circuits 530 can have access to a controller memory 522. In some embodiments, a the controller memory 522 is a RAM and can store mapping information for accessing storage locations in NVM based on received address values (e.g., from a master controller).

ECC circuits 532 can perform error detection and/or correction operations on data transfers to and from NVM by way of NVM controller 526. In some embodiments, ECC circuits 532 can perform error correction on any other data values input and/or output from a slice section 502, including data values on the memory bus side.

DMA circuits 544 can execute DMA transfers of data into and out of slice controller 510. In some embodiments, DMA circuits 544 can include a DMA slave circuit, controllable by MCU 530 to enable DMA transfers to and/or from locations in NVM via NVM controller 526. However, in alternate embodiments, such a DMA slave circuit can be controlled by a master external to the slice section 502, including but not limited to, a master controller (e.g., 104, 304) or a host memory controller.

While some embodiments can include a page buffer 546, other embodiments may not include a page buffer 546. A page buffer 546 can store blocks of data that have been retrieved from NVM memory (not shown) or that are to be programmed into NVM memory. Data transfers between page buffer 546 and NVM can be performed by NVM controller 526, which can be controlled by MCU 530.

Encryption/decryption circuits 534 can encrypt/decrypt data as described herein, or equivalents. In the particular embodiment shown, encryption/decryption can occur according to the AES standard, however, embodiments can encrypt/decrypt according to any suitable standard.

A slice store 512 can include a volatile memory 540 and a host memory channel I/F 542. A volatile memory 540 can store data in transit between NVM, by way of NVM controller 526, and a memory bus, by way of host memory channel I/F 542. A volatile memory 540 can provide a fast access speed to enable data to be accessed in rapid fashion via host memory channel I/F 542. In some embodiments, a volatile memory 540 can be SRAM, in particular embodiments, a multi-port SRAM. A host memory channel I/F 542 can enable data transfers with a portion (e.g., slice) of a host memory channel. In particular embodiments, host memory channel I/F 542 can be a slave I/F to a bus master, such as a memory controller, as but one particular example.

Optionally, a slice section 502 can include controller memory 522 for use by an MCU 530 in executing various functions. In the particular embodiment shown, controller memory 522 can be a RAM, formed of DRAM or SRAM, as but two examples.

Figure 6:
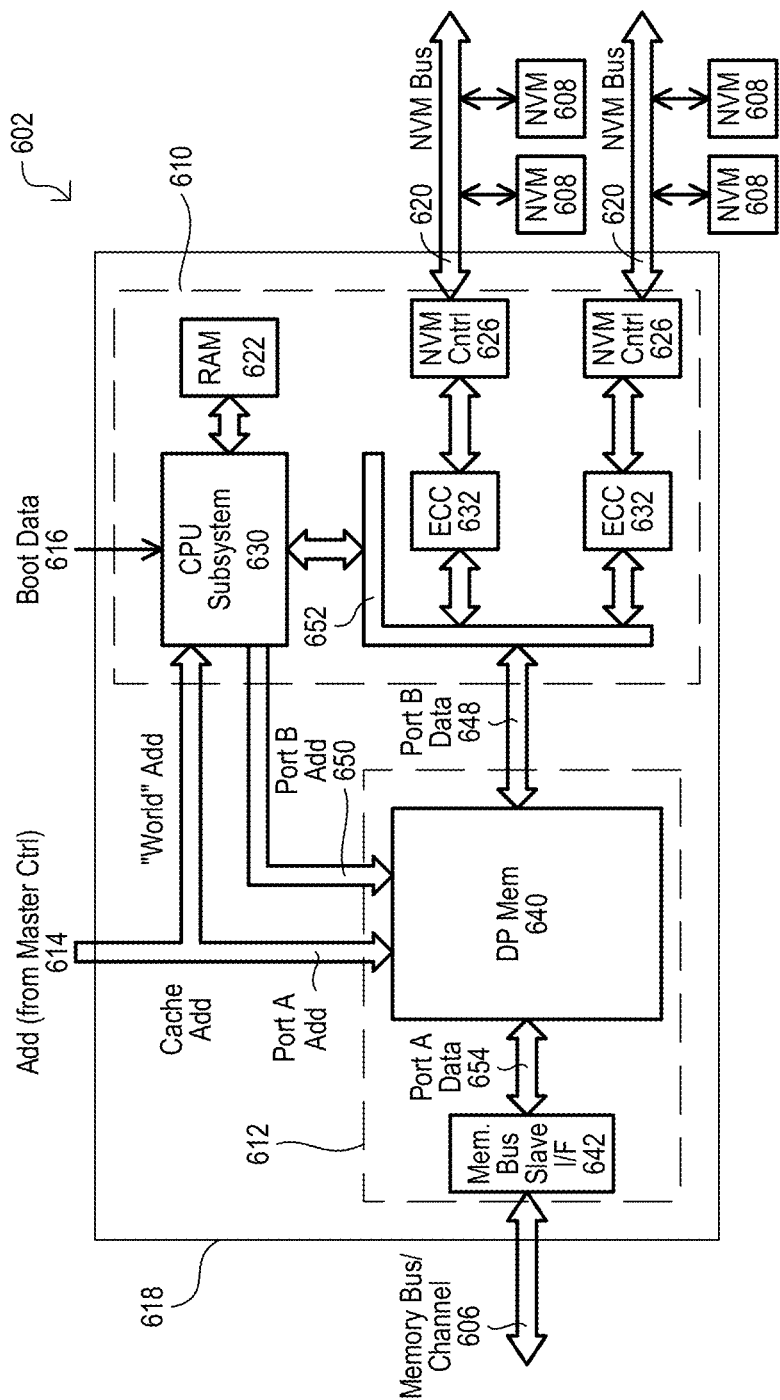
FIG. 6 is a detailed block schematic diagram of a slice section according to one particular embodiment.

FIG. 6 illustrates a slice section 602 in accordance with one embodiment. A slice section 602 can be one particular implementation of those shown herein. A slice section 602 can include a slice controller 610, slice store 612, and NVM 608.

A slice controller 610 can include a CPU subsystem 630, ECC circuits 632, NVM controllers 626, a controller memory 622, a controller side data bus 648 and an address 650 bus. A CPU subsystem 630 can take any suitable form according to the functions of the slice controller, including any of: one or more CPU cores, nonvolatile and/or volatile memory, non-CPU circuits, one or more memory controllers, I/O bridges, and buses, for example.

In the embodiment shown, CPU subsystem 630 can be connected to module bus 614, controller side address bus 650, controller side data bus 648, controller memory 622, and a slice communication channel 616. A module bus 614 can carry address information for accessing storage locations in NVM 608 or slice store 612. It is understood that module bus 614 can be common to a number of different slice sections, each corresponding to a portion of a larger data value. In the embodiment shown, address information on module bus 614 can represent a "world" address or a cache address. A world address can be a logical address that is translated by CPU subsystem 630 into an NVM physical address. A cache address can be processed by slice store 612 for an access that can be faster than an access to NVM. In very particular embodiments, a difference between a world address and cache address can be established by a master control, and so be inherent in the address value (e.g., different ranges). However, in other embodiments, a CPU subsystem 630 can execute address translation on addresses received over module bus 614.

CPU subsystem 630 can be connected to slice store 612 by controller side data and address buses 648/650. CPU subsystem 630 can accesses storage locations in slice store by way of such buses 648/650. In the embodiment shown, buses 648/650 can be one port (Port B) of a dual port memory within slice store 612, with CPU subsystem 630 being connected Port B data bus 648 by way of slice bus 652.

CPU subsystem 630 can access controller memory 622 to execute its various functions. A controller memory 622 can be integrated with CPU subsystem 630, integrated with a package that includes CPU subsystem 630, or can be a device separate from CPU subsystem. A controller memory 622 can take any suitable form, but in particular embodiments is a dense, low power, fast access speed memory, such as DRAM or SRAM. In particular embodiments, controller memory 622 can include a mapping table to enable CPU subsystem 630 to map world addresses to physical addresses in NVM 608.

A slice communication channel 616 can enable slice controller 610 to receive, and in some cases, transmit signals other than those used to access storage locations in NVM 608 and slice store 612. It is understood that a slice communication channel 616 can be connected to all slice sections of a module. In the embodiment shown, slice communication channel 616 can provide boot data for CPU subsystem 630. For example, in response to predetermined events (e.g., POR—Power On Reset), a slice communication channel 616 can commonly provide boot data for CPU subsystems (e.g., 630) of all slice sections.

NVM 608 can be connected to slice store 612 by way of ECC circuits 632 and NVM controllers 626, which can transfer data between NVM 608 and slice store 612 as described herein, or equivalents. In the particular embodiment shown, ECC circuits 632 can be connected to Port B data bus 648 by slice bus 652. CPU subsystem 630 can control accesses to NVM 608 by operating NVM controllers 626 through slice bus 652.

A slice store 612 can include a multi-port memory 640 and a memory bus slave I/F 642. In the particular embodiment shown, a multi-port memory 640 can receive addresses for a first port (Port A) from module bus 614, and can have the data bus for Port A connected to memory bus slave I/F 642. As noted above, multi-port memory 640 can receive addresses for a second port (Port B) from CPU subsystem 630 and have the data bus for Port B connected to CPU subsystem 630 and NVM 608. Multi-port memory 640 can be any suitable dual-port memory, but in particular embodiments can be a dual-port SRAM.

A memory bus slave I/F 642 can connect a data bus 654 of one port (Port A) to a portion of a memory bus 606. A memory bus slave I/F 642 can be a slave interface for a memory controller operating according to any suitable protocol. In particular embodiments, memory bus slave I/F 642 can be an interface operating according to any of the DDR type protocols.

NVM 608 can be connected to NVM controllers 626 by NVM channels 620. While FIG. 6 shows two buses, other embodiments can include fewer or greater numbers of NVM buses/controllers.

Figure 7:
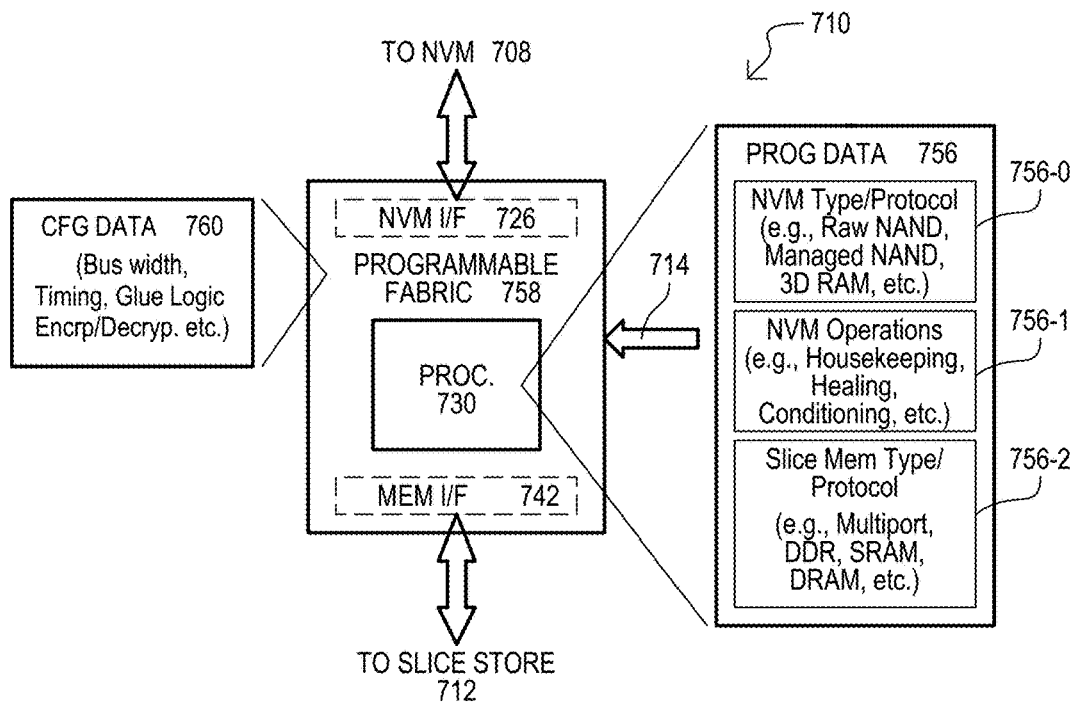
FIG. 7 is a block diagram of a slice controller having programmability options according to an embodiment.

According to some embodiments, a slice controller can have some programmability to accommodate different types of NVMs. FIG. 7 shows one example of a slice controller that can be included in embodiments. A slice controller 710 can include any of a processor section 730 and/or a programmable fabric 758. A processor section 730 can be programmed to perform various operations according to program data 756. In the particular embodiment shown, program data 756 can include NVM type/protocol data 756-0, which can include programs that vary according to the type of NVM included in a slice section. Thus, a processor section 730 can be programmed to vary how NVM are accessed based on the type of NVM. Similarly, program data 756 can include slice memory type/protocol data 756-2, which can include programs that vary according to the type of slice memory included in a slice section. Thus, processor sections 730 can programmed to vary according to the type of slice memory. Program data 756 can further include programs 756-1 to execute operations for maintaining NVM of the slice section.

Programmable fabric 758 can include programmable logic circuits configurable according to configuration data 760. In the particular embodiment show, configuration data 760 can enable programmable fabric 758 to be programmed to enable different data widths, different timing, have different glue logic between other circuits of the slice controller 710, different encryption/decryption circuits, to name only a few.

A slice controller 710 can further include NVM controller circuits 726 for interfacing with NVM 708, and a memory interface circuits 742 for interfacing with a slice store 712. Either of such circuits (726 or 742) can be "hard" circuits, or all or a portion of such circuits can be realized with programmable fabric 758.

A slice controller 710 can receive address or other data via module bus 714 as described herein, or an equivalent.

Figure 8A:
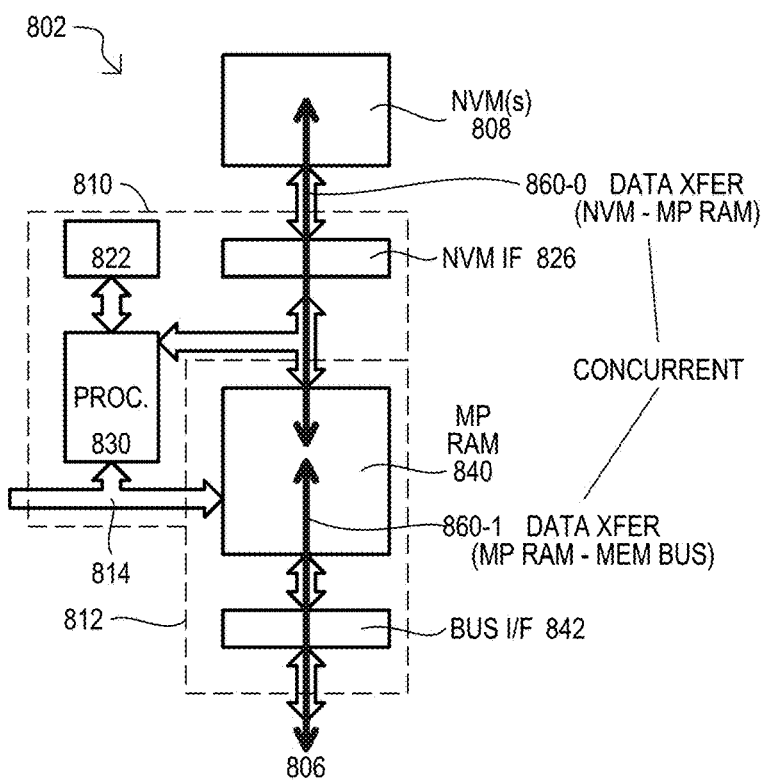
FIGS. 8A to 8C are block schematic diagrams showing various operations executable by a slice section according to embodiments.
Figure 8B:
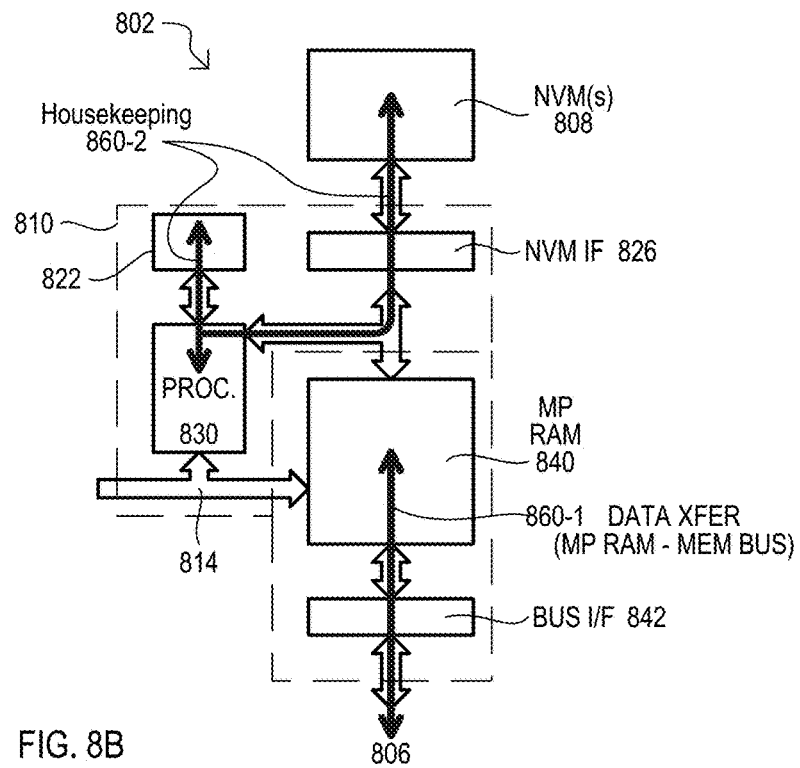
Figure 8C:
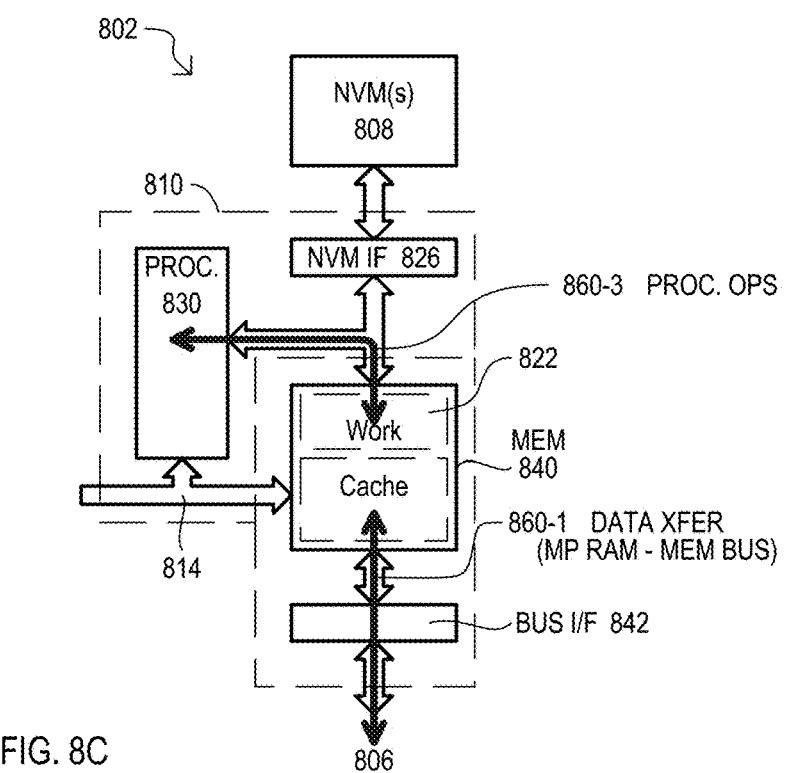

While slice sections can perform any of the functions and/or methods noted herein, particular functions/methods will now be described with reference to FIGS. 8A to 8C. FIGS. 8A to 8C show a slice section 802, which can be an implementation of any other suitable embodiments shown herein. FIGS. 8A to 8C show a slice section 802 connected to a portion of a memory bus 806 that includes NVM 808, a slice controller 810, and slice store 812. Slice controller 810 can be connected to a module bus 814, and include a processor section 830, controller memory 822, and NVM control circuits 826. Such components can operate according to any of those shown herein, or equivalents. A slice store 812 can include memory circuit 840 and bus interface 842. Memory circuit 840 can include any memory for storing slice data as described herein, and in particular embodiments can include a multi-port memory or a "fast" memory. Bus interface 842 can include an interface with a portion of memory bus, as described herein, or equivalents.

FIG. 8A shows how a slice section 802 can execute two different data transfers (shown by bold lines) concurrently: (1) data transfers 860-0 between NVM 808 and memory circuits 840 and (2) data transfers 860-1 between memory circuits 840 and memory bus 806. In some embodiments, memory circuits 840 can include a dual-port memory, with data transfer 860-0 occurring via one memory port, while data transfers 860-1 occur via another memory port.

However, in alternate embodiments, memory circuits 840 can be a single port memory operating at a higher speed with respect to data transfers 860-0/1. As but one particular example, data transfers 860-0 between NVM 808 and memory circuits 840 can take substantially longer than data transfers 860-1 between memory circuits 840 and data bus 806. However, memory circuits 840 can have access speeds that are faster than data transfers 860-1 (e.g., can execute at least two data transfers within one clock cycle of data transfers 860-1. In such cases, such "fast" memory circuits 840 can be the equivalent of a multi-port memory.

FIG. 8B shows how a slice section 802 can execute two different operations concurrently: (1) data transfers 860-1 between memory circuits 840 and memory bus 806 and (2) housekeeping operations 860-2 on the NVM 808. Housekeeping operations can include any operations that maintain an operational state of NVMs as described herein, or equivalents. In the embodiment shown, housekeeping operations 860-2 can access controller memory 822. In a particular arrangement, housekeeping operations 860-2 can update/alter a mapping table used to indicate a status of NVM portions (e.g., blocks) as well as enable translation between received addresses values and NVM physical addresses.

FIG. 8C shows how a slice section 802 can execute other operations concurrently. Further, FIG. 8C shows how memory circuits 840 can be partitioned into different portions for different functions. One operation shown are data transfers 860-1 between memory circuits 840 and memory bus 806. Such operations can access one portion of memory circuits (referred to as cache, but in some embodiments, may not be a cache, but rather an intermediate storage location for data to/from NVM 808). The other operations are processor operations 860-3, which can access a different portion of memory circuits 840, which can serve as controller memory 822. Controller memory 822 can perform the various functions for embodiments described herein, and equivalents. Further, in some embodiments, a partitioning of memory circuits 840 can be changed as needed by a function or configuration.

Figure 9:
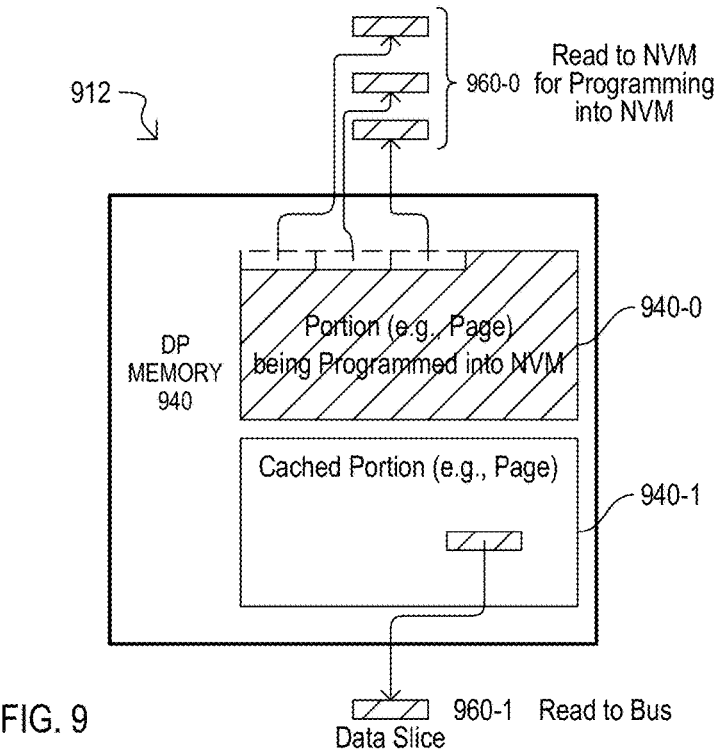
FIG. 9 is a block diagram showing data transfer operations in a slice store according to embodiments.

FIG. 9 is a diagram showing slice store accesses according to an embodiment. A slice store 912 can be one version of those shown in other embodiments herein, and can include dual-port memory circuits 940, with one data port being connected to NVM and the other connected to a data bus, as described for other embodiments herein, and equivalents. Memory circuits 940 can store various portions of data stored in the NVM (e.g., can serve as a cache). FIG. 9 shows how as a slice of data is being read out onto a memory bus (960-1) from one portion of stored data 940-1, another portion of data 940-0 can be read out into NVM. It is understood that either of such operations can be write operations. That is, data from NVM can be written into memory circuits 940 while data are read from memory circuits 940; data from NVM can be written into memory circuits 940 while data from memory bus are written into memory circuits 940; and data can be read from NVM into memory circuits 940 while data from data bus are written into memory circuits 940.

In some embodiments, data transfers to NVM from memory circuits 940 can be in chunks of data larger than those transferred between memory circuits 940 and a data bus. In particular embodiments, data transfers to/from NVM can be in pages, or larger blocks, while data transfers to/from data bus can be portions of larger data value (e.g., ×1, ×2, ×4, ×8, ×16 of a double word; ×1, ×2, ×4, ×8 of a word; ×1, ×2, ×4 of a byte).

Figure 10:
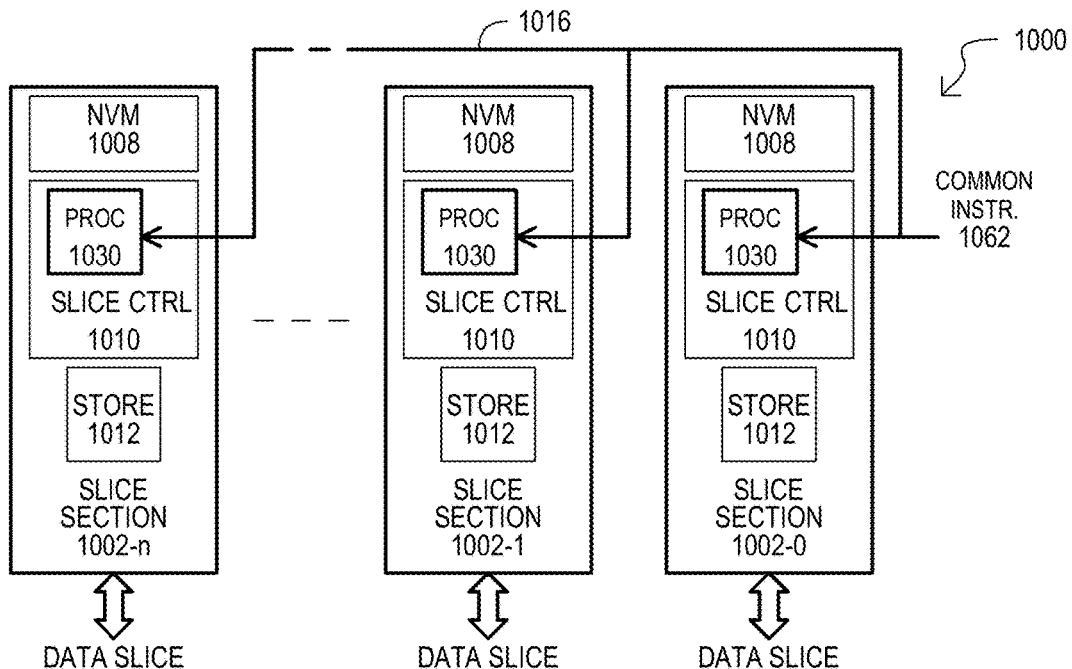
FIG. 10 is a block schematic diagram showing how slice sections can receive common signals according to an embodiment.

As noted herein, while slice sections can commonly receive address values, slice sections can also receive other values (and transmit other values), by way of a slice communication channel. FIG. 10 shows a memory module 1000 according to such an embodiment. FIG. 10 shows a memory module 1000 having slice sections 1002-0 to -n in communication with a slice communication channel 1016.

Data provided over slice communication channel 1016 can take any suitable form. In some embodiments, a slice communication channel 1016 can be used to commonly load code for processor sections 1030 of slice controllers 1010. Accordingly, only one memory or data source can be used for multiple slice sections. In addition or alternatively, a slice communication channel 1016 can convey interrupts or indicate module or system events. For example, a slice communication channel 1016 can indicate power-up, power down operations, or save operations. In such cases, signals over slice communication channels 1016, or each slice section's response to such signals, can enable staggered power up or power down operations among slice sections. In case of power down and save operations, such a response can reduce current draw, which could otherwise tax a back-up power supply (e.g., battery, supercapacitor) used to back-up data in a slice store by programming the data into the NVM of the slice section.

In some embodiments, there can be variations in the response of each slice section on the same memory module. For example, slice data access times can vary between slice sections, as each slice controller can be managing a different set of NVM devices, have different ECC responses, etc. Accordingly, in some embodiments, a memory module can generate a signal indicating a status of all slice sections. As but one very particular example, slice sections can generate status information to generate a "wait" signal, that can provide an indication that data is ready to be read, or when the read data is expected to be ready (e.g., Wait).

Figure 11A:
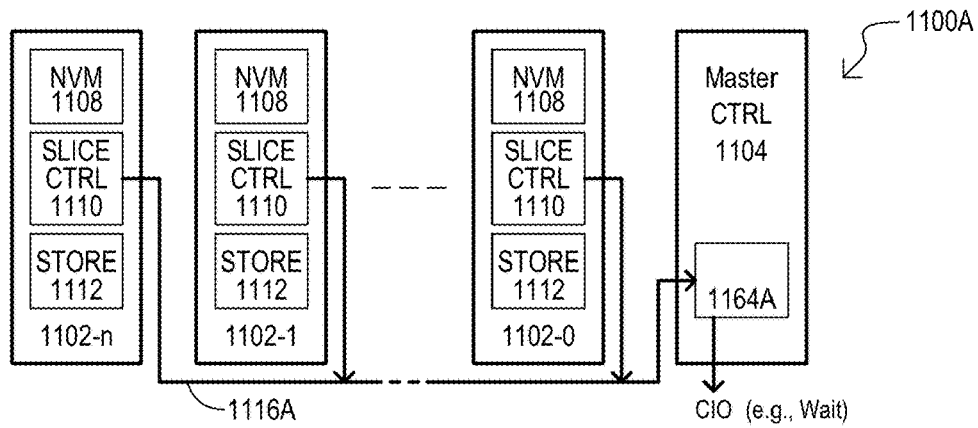
FIGS. 11A and 11B are block schematic diagrams showing the generation of slice status signals can be generated according to various embodiments.

FIG. 11A shows a memory module 1100A according to an embodiment. In memory module 1100A, each slice section 1102-0 to -n can provide one or more status indications to a module signal circuit 1164A within a master controller 1104. Such status indications can be provided over a slice communication channel 1116. Module signal circuit 1164A can then generate a module indication (control output) CIO from master controller 1104 based on the status information from the slice sections. It is understood that how information is transmitted from each slice section 1102-0 to -n can vary according to embodiments. For example, in some embodiments, some or all slice sections 1102-0 to -n can issue a separate indication over slice communication channel 1116. However, in other embodiments, slice communication channel 1116 can receive all such indications at once (e.g., a wire-OR or wire-AND type response).

Module signal circuit 1164A can generate an indication CIO based on indications received and/or other signals from a master controller. While an indication CIO can be activated essentially simultaneously with indications from slice sections 1102-0 to -n, in some embodiments, an indication CIO can be generated with some predetermined delay (e.g., clock cycles) after indications are received from slice sections 1102-0 to -n.

Figure 11B:
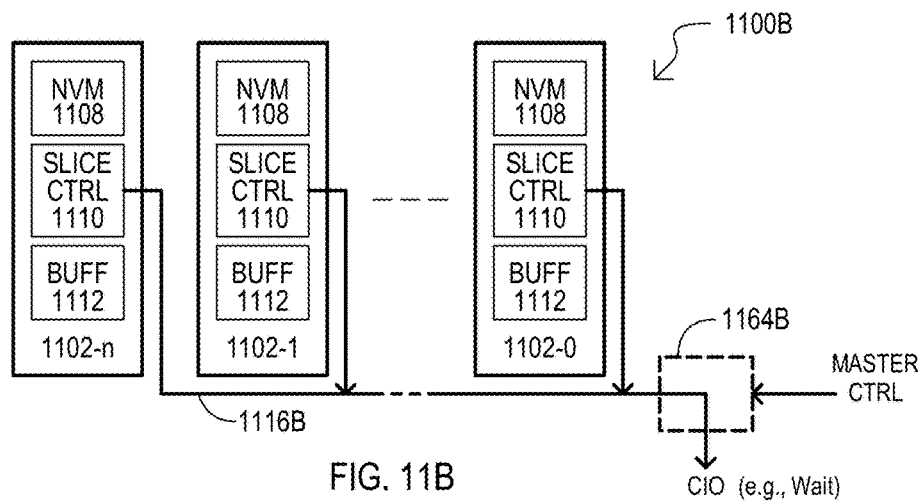

FIG. 11B shows a memory module 1100B according to another embodiment. In memory module 1100B, slice sections 1102-0 to -n generate a module indication CIO independent of, or with limited input from, a master controller (not shown). In such an embodiment, a module indication CIO can be a single signal, or can be multiple signals. In the former case, a slice communication channel 1116B can operate in a wire-OR/AND type fashion. In the latter case, module indication CIO can be multiple signals, or indications from slice sections (1102-0 to -n) which can be combined by logic in a module signal circuit 1164B. In some embodiments, a module signal circuit 1164B can also use one or more inputs from a master controller to generate signal CIO.

It is understood that while the embodiments of FIGS. 11A and 11B describe arrangements in which module indication CIO can signal when all data slices are ready (or will be ready), in alternate embodiments, module indication CIO can indicate when portions of a data word are ready, including when each data slice is ready (or will be ready).

Figure 12:
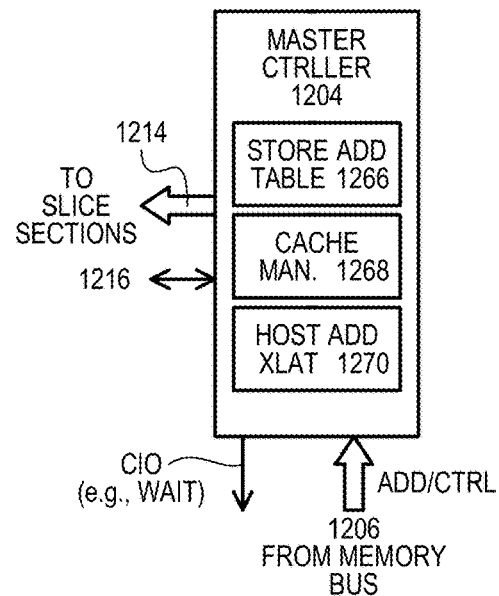
FIG. 12 is a block diagram of a master controller that can be included in embodiments.

FIG. 12 is a block diagram of a master controller 1204 that can be included in embodiments. A master controller 1204 can be one particular implementation of those shown in other embodiments. A master controller 1204 can receive address and control ADD/CTRL signals (e.g., command and address signals) from a memory bus 1206, and in response, generate address values on a module bus 1214 common to slice sections.

In the embodiment shown, a master controller 1204 can include a store address table 1266, cache manager 1268, and a host address translator 1270. A store address table 1266 can track which data values are contained in the slice stores of each slice section. In the embodiment shown, slice stores can serve as a cache. Cache manager 1268 can control the cache presented by slice sections. In some embodiments, a master controller 1204 can communicate over module bus 1214 and/or slice communication channel 1216 to ensure cache states are maintained.

A host address translator 1270 can translate addresses received over a memory bus 1206, to generate address values on module bus 1214 for slice sections. In some embodiments, host address translator 1270 can also determine when cache hits occur, and generate addresses or additional signals that indicate to slice sections that the cache hit has occurred.

Figure 13:
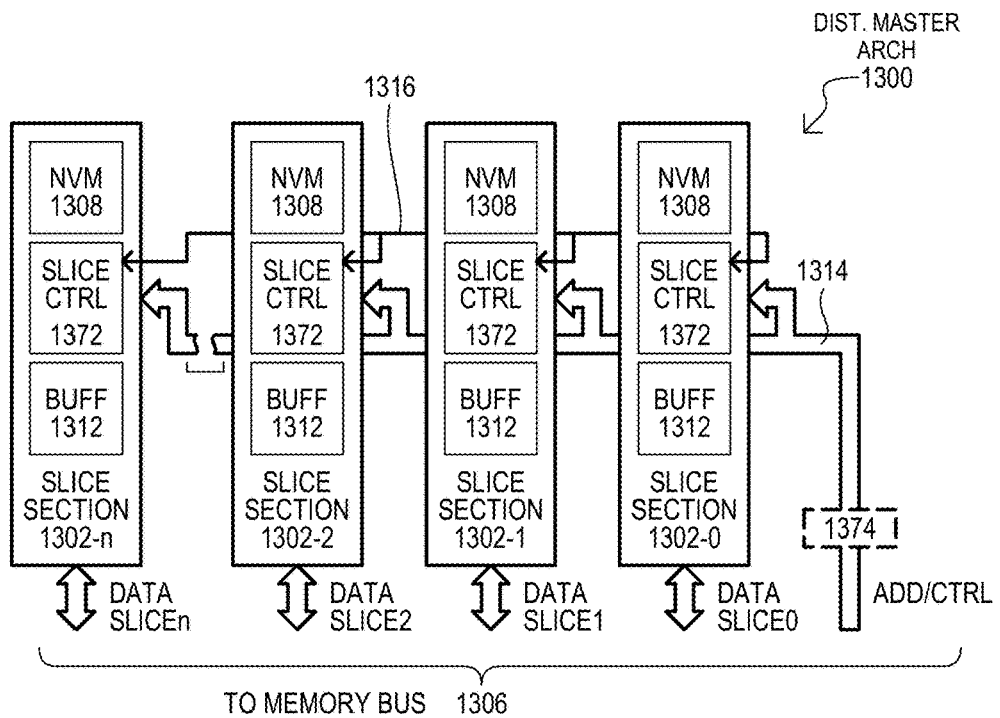
FIG. 13 is a block schematic diagram of a memory module having a distributed master according to one embodiment.

While embodiments can include memory modules with a master controller, alternate embodiments can integrate all or some of the master controller functions into the slice sections. One example of a memory module having such a "distributed master" (or "no master") architecture is shown in FIG. 13.

A memory module 1300 can include a number slice sections 1302-0 to -n, that can receive address and control signals (ADD/CTRL) (e.g., command and address signals) from a memory bus 1306. Each slice section (1302-0 to -n) can also provide a different portion (SLICE0 to SLICEn) of a data value on memory bus 1306. Unlike an embodiment like that of FIG. 1, a memory module 1300 does not include a master controller. Rather, the slice sections (1302-0 to -n) can be in communication with one another, over a slice communication channel, to perform functions equivalent to a master controller. Accordingly, in embodiments like that of FIG. 13, slice sections (1302-0 to -n) can include "smart" slice controllers 1372 that can perform the functions of a master controller.

It is understood that master controller functions can exist in but one slice section (1302-0 to -n) and/or distributed over some or all slice sections.

In some embodiments, there can be an intermediate circuit 1374 between address and control values (ADD/CTRL) (e.g., command and address signals). Intermediate circuit 1374 can perform any of a number of functions to ensure address and control values a received at slice sections (1302-0 to -n), including but not limited to: buffering the signals, capturing the signals in a register, or presenting a reduced load on the memory bus side.

Figure 14:
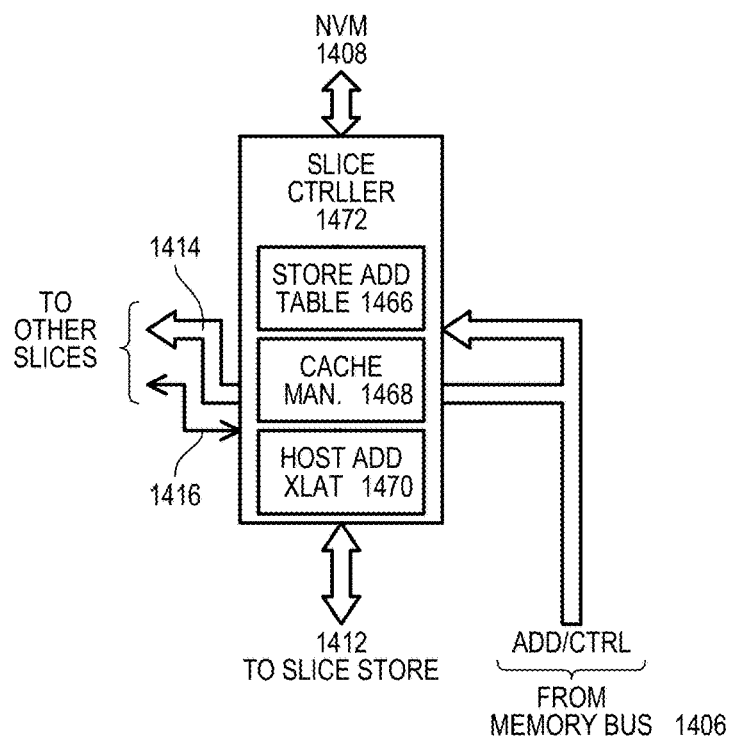
FIG. 14 is an example of a slice controller that can be included in an embodiment like that of FIG. 13.

FIG. 14 is a block diagram of a "smart" slice controller 1472 that can be included in embodiments like that of FIG. 13. Slice controller 1472 can receive address and control ADD/CTRL signals (e.g., command and address signals) from a memory bus 1406 and process such signals to access the NVM 1408 or slice store 1412 of the slice section. According to embodiments, a slice controller 1472 can include any of: a store address table 1466, cache manager 1468, and a host address translator 1470, as described for a master controller. Slice controllers 1472 can communicate with other slice controllers over a slice communication channel 1416.

While embodiments can include memory modules of various forms according to the memory bus to which it is attached, in some embodiments, memory modules can be DIMM compatible modules for insertion into DIMM connections of a system memory bus. Examples of such embodiments are shown in FIGS. 15A to 16.

Figure 15A:
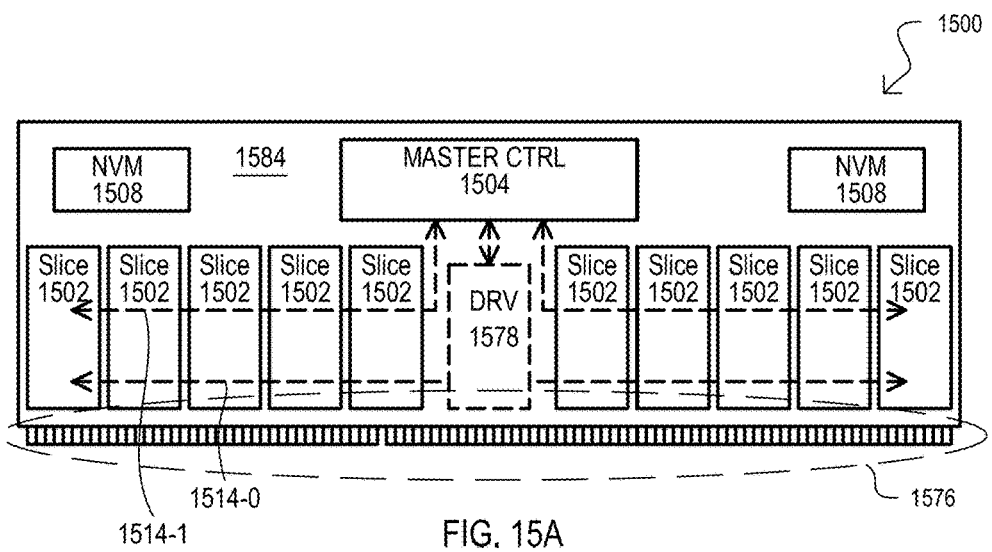
FIGS. 15A to 16 are diagrams of NVDIMM modules according to particular embodiments.
Figure 16:
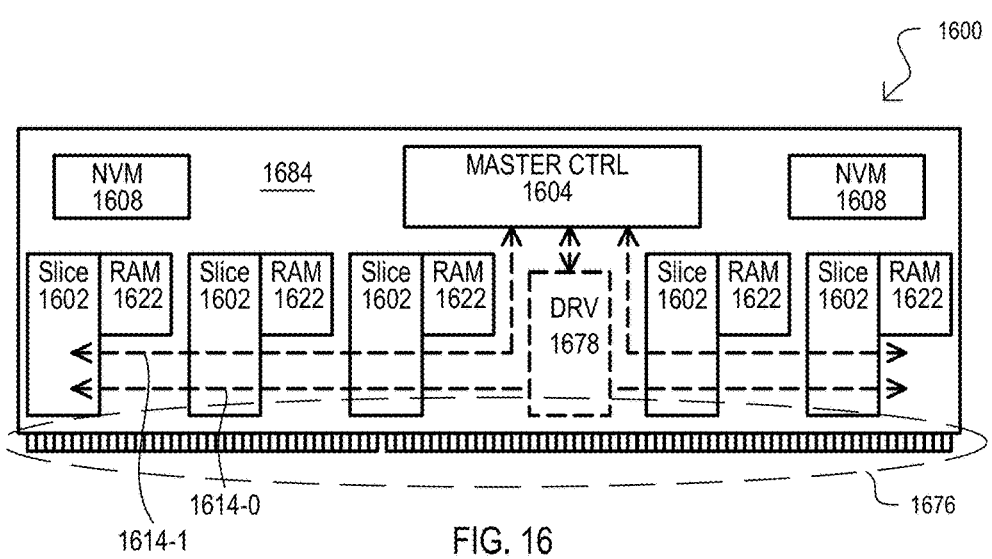

FIG. 15A shows a first side of a NVDIMM type memory module 1500 according to one embodiments. A memory module 1500 can include various integrated circuit packages mounted on a printed circuit board (PCB) 1584 having a physical bus interface 1576. Integrated circuit components can include, but are not limited to: slice sections 1502, a master controller 1504, and NVM 1508. Such components can take the form of any of those shown herein, or equivalents. In some embodiments, a memory module 1500 can further include a driver circuit 1578 for receiving and conditioning address, command and clock signals received from a memory bus. In particular embodiments, driver circuit 1578 can be a registered clock driver (RCD) integrated circuit, or equivalent.

A module bus 1514-0/1 can include one portion 1514-0 that connects master controller 1504 to slice sections 1502, and another portion 1514-1 that connects driver circuit 1578 to slice sections 1502.

Figure 15B:
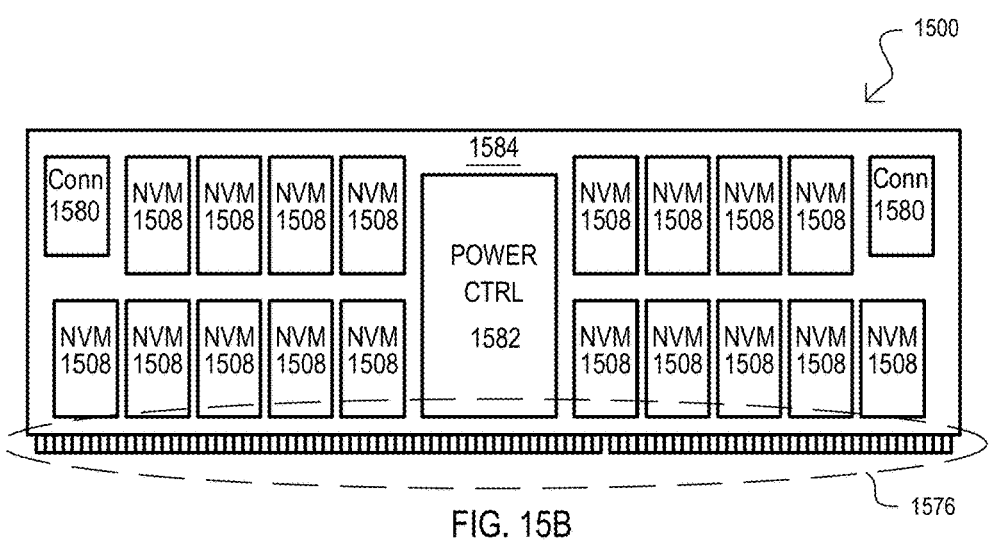

FIG. 15B shows a second side of a NVDIMM type memory module 1500. Mounted on a second side can be more NVM 1508, as well as power control circuits 1582 and connectors 1580. Power control circuits 1582 can control power operations for memory module 1500, including switching over to backup power in the event of main power failure, to enable data stored in volatile memory (e.g., slice store) to be programmed into NVM. The physical bus interface 1576 and/or connector 1580 can provide connection to power supplies, back-up power supplies, or the like.

In some embodiments, each slice section 1502 of NVDIMM type memory module 1500 can provide ⅛ of a larger data value (e.g., 8-bits of a 64-bit data bus), with two more slice sections providing ECC values.

FIG. 16 shows a first side of a NVDIMM type memory module 1600 according to another embodiment. Memory module 1600 can include components like those of FIGS. 15A/B, and such like components can be the same as, or equivalents of, those shown in FIG. 15A.

FIG. 16 can differ from that of FIG. 15A in that each slice section 1602 can have a corresponding controller memory 1622, which can be accessed by a slice controller. In some embodiments, each slice sections 1602 of NVDIMM type memory module 1600 can provide ¼ of a larger data value (e.g., 16-bits of a 64-bit data bus), with one additional slice section providing ECC values.

In a particular embodiment, an opposing side of memory module 1600 can take the form of that shown in FIG. 15B, or an equivalent.

Figure 17A:
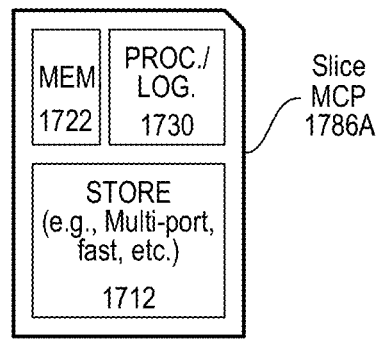
FIGS. 17A and 17B are diagrams showing multi-chip packages that can be included in embodiments.
Figure 17B:
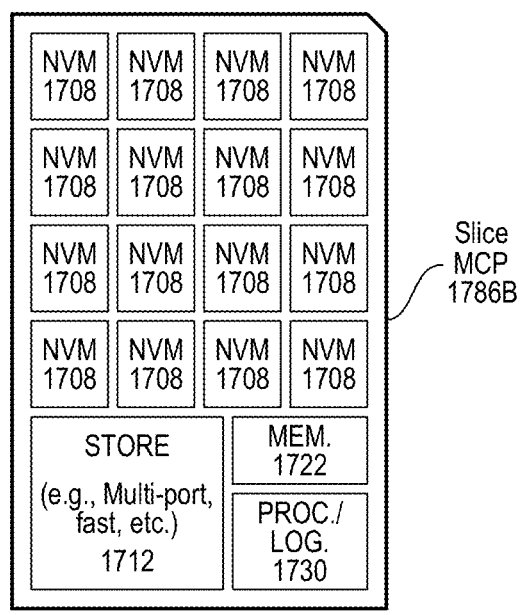

While components of a slice section can be integrated in any suitable fashion, FIGS. 17A and 17B show multi-chip packages (MCPs) that can for all or parts of a slice section. FIG. 17A shows an MCP 1786A that can include processor logic 1730 for a slice controller, controller memory 1722 accessible by processor logic 1730, and a slice store 1712. Such components can take the form of, and perform the functions of, any of those shown herein, or equivalents.

FIG. 17B show a MCP 1786B like that of FIG. 17A, but with the addition of NVM 1708 being further included in the same MCP 1786B.

Figure 18A:
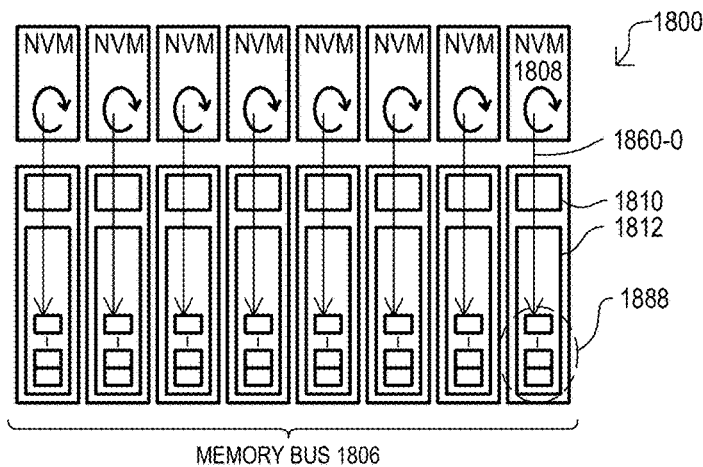
FIGS. 18A to 18C are block diagrams showing data transfer operations of a memory module according to particular embodiments.
Figure 18B:
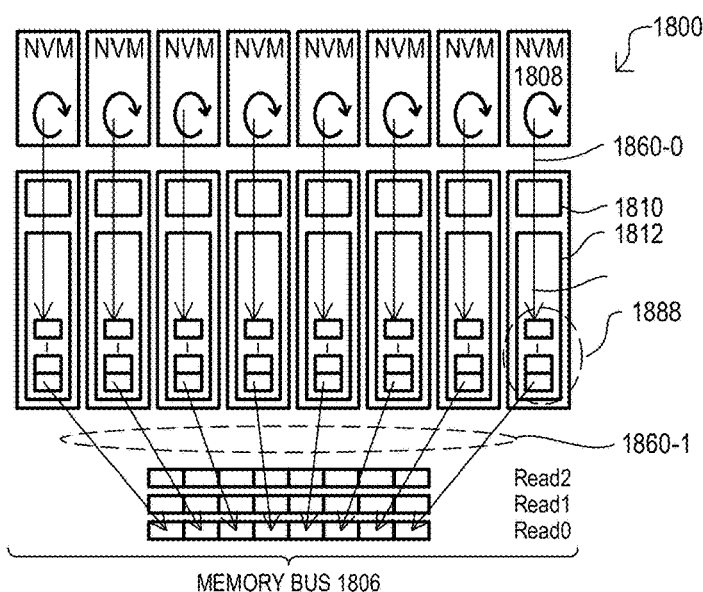
Figure 18C:
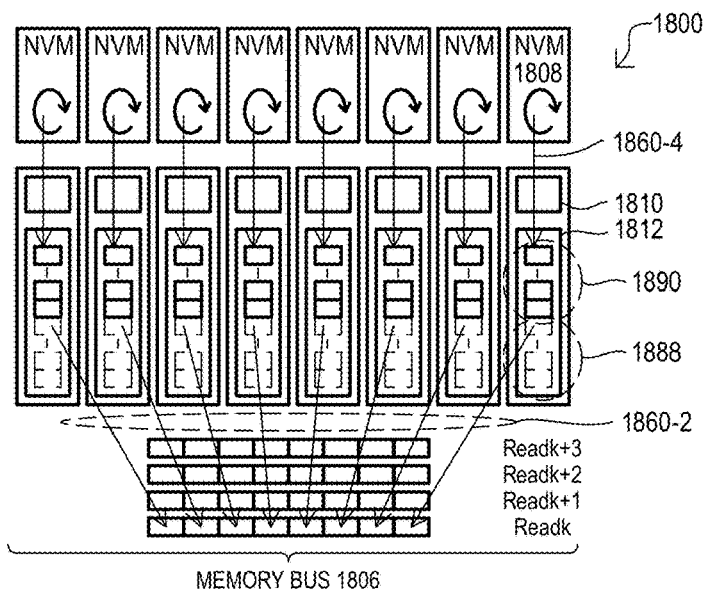

FIGS. 18A to 18C are a sequence of diagrams showing sustained memory transfer operations of a memory module 1800 according to one embodiment. A memory module 1800 can include NVM 1808, slice controller 1810, and slice store 1812.

FIG. 18A shows a data transfer 1860-0 from NVM 1808 to slice store 1812. Such a transfer can involve a relatively large amount of data, and take a relatively large amount of time, as compared to data transfers over a corresponding memory bus 1806. Data transfer 1860-0 can result in a relatively large amount of first data 1888 being stored in each slice store 1812.

FIG. 18B shows how portions of first data 1888 can be read out onto memory bus 1806 by data transfers 1860-1. Such data transfers 1860-1 to memory bus 1806 can occur at a much faster rate than those from NVM. However, because NVM data transfers 1860-0 provide a large amount of data, in a sustained data transfer, such large amounts of data can result in many reads onto data bus 1806.

FIG. 18C shows how another data transfer 1860-4 can begin from NVM to slice store 1812 even as data transfers of first data 1888 one to memory bus 1806 continue.

In this way, in sustained data transfers, because slice sections 1802 service only a portion (e.g., slice) of a larger data value, transfers from NVM can be relatively "deep", and therefore able to keep up with fast transfers via a memory bus. It is understood that sustained write operations can occur in the same fashion, with "deep" write data for each slice received over the memory bus accumulating in each slice store before being programmed into NVM.

Figure 19:
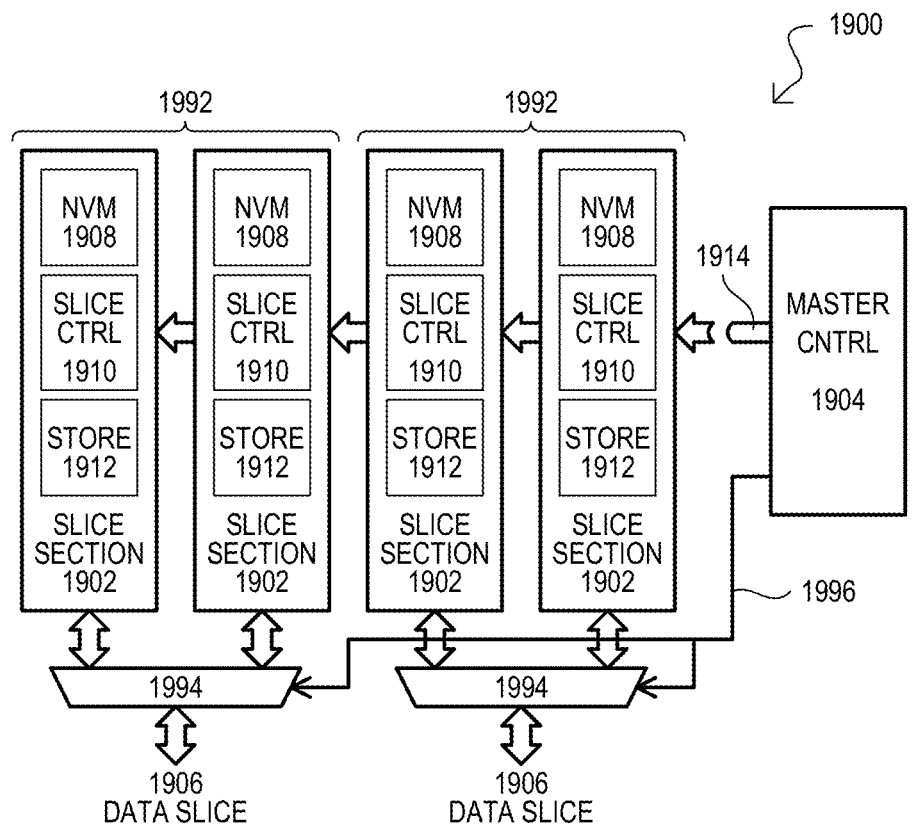
FIG. 19 is a block schematic diagram showing the multiplexing of slice sections according to embodiments.

FIG. 19 shows a memory module 1900 according to a further embodiment. Memory module 1900 can include items like those of FIG. 1, which are referred to by the same reference character but with the leading digit(s) being a "19" instead of a "1". Such like items can take the form of, and perform the functions of, any of those shown herein, or equivalents.

FIG. 19 differs from that of FIG. 1 in that there can be groups of slice sections groups 1992, which can be switched to a same portion (e.g., slice) of a memory bus 1906 by operation of MUXs 1994. MUXs can be controlled by MUX controls signals 1996. In the particular embodiment shown, MUX control signals 1996 can be generated by a master controller 1904.

In one very particular embodiment, slice sections groups 1992 can provide redundancy (or mirroring). When one slice section 1902 of a group 1992 is no longer operating properly, operations can switch to another slice section of the same group 1992. In a particular embodiment, writes for a data slice can be executed on all slice sections 1902 of a group 1992, while read operations are performed on only one slice section.

In another particular embodiment, slice sections groups 1992 can provide greater storage. MUXs 1994 can be switched in address values received by master controller 1904.

Of course, MUXing can serve any other suitable function.

It is understood that embodiments can include systems that employ memory modules as described herein and equivalents. Such systems can have any suitable memory bus operating according to various protocols, thus embodiments encompass a large number of configurations.

Figure 20:
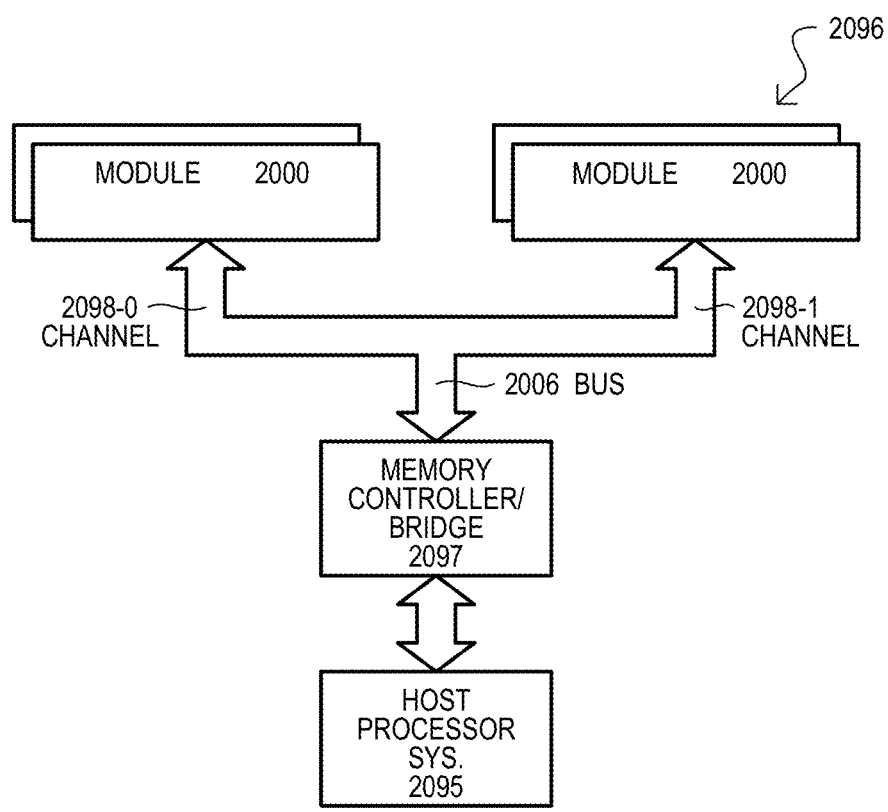
FIG. 20 is a block schematic diagram of a system according to one particular embodiment.

FIG. 20 is a block diagram of a system 2096 according to one very particular embodiment. A system 2096 can include memory modules 2000 according to embodiments herein, or equivalents, connected to different channels 2098-0/1 of a system memory bus 2006. Accesses over memory bus 2006 can be controlled by a memory controller/bridge 2097. Memory controller/bridge 2097 can be controlled by a host processor system 2095.

It should be appreciated that reference throughout this description to "one embodiment" or "an embodiment" means that a particular feature, structure or characteristic described in connection with the embodiment is included in at least one embodiment of an invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

It is also understood that other embodiments of this invention may be practiced in the absence of an element/step not specifically disclosed herein. Further, while embodiments can disclose actions/operations in a particular order, alternate embodiments may perform such actions/operations in a different order.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A memory module, comprising:
    a data bus;
    a plurality of slice sections, each slice section configured to input and output a slice of a data for a different section of the data bus;
    each slice section comprising:
    at least one nonvolatile memory (NVM);
    a memory element to store the slice of the data for the slice section during operations that transfer the slice of the data between the section of the data bus for the slice section and the NVM of the slice section; and
    a slice controller configured to translate an address for the slice of the data for the section of the data bus into at least a physical address of the NVM of the slice section; and
    the memory element comprising a multi-port random access memory having at least a first address port coupled to receive address data from an address bus common to the plurality of slice sections and at least a second address port coupled to receive an address from the slice controller of the slice section;
    wherein the slice controller is configured to simultaneously:
    transfer data between the corresponding NVM and the corresponding memory element of the slice section, and transfer data between the corresponding memory element of the slice section and the address bus.

2. The memory module of claim 1, the memory element comprising a multi-port random access memory having at least a first data port coupled to the section of the data bus for the slice section, and at least a second data port coupled to the NVM of the slice section.

3. The memory module of claim 1, the memory element configured to cache at least a portion of data stored in the NVM of the slice section.

4. The memory module of claim 1, the memory element comprising a physical slave interface responsive to a master device to transfer the slice of data over the section of the data bus for the slice section.

5. The memory module of claim 1, the slice controller comprising:
   at least one processor; and
   at least one processor memory configured to store instructions executable by the at least one processor for operating the NVM of the slice section.

6. The memory module of claim 1, further comprising:
   the data bus is part of a memory bus;
   the memory module further comprising:
   a master controller configured to generate at least slice address values in response to address and control signals received on the memory bus; and
   a slice address bus, that couples to the master controller, to transfers the slice address value to each slice section.

7. A system, comprising:
   a plurality of memory modules coupled to a system memory bus interface, each memory module including nonvolatile memory (NVM) arranged into slice sections that each store a slice of a data for different portions of an access transfer width of a system memory bus;
   a module bus; and
   a slice controller corresponding to each slice section, each slice controller configured to access the slice of the data in the NVM of the corresponding slice section in response to address data received on the module bus;
   the slice controller configured to translate an address for the slice of the data for the section of the data bus into at least a physical address of the NVM of the slice section; and
   wherein each of the memory modules further comprising:
   a data slice store, the data slice store to cache a portion of data stored in the NVM of the corresponding slice section; and
   wherein the data slice store comprising a multi-port random access memory having at least a first address port coupled to receive address data from an address bus common to the plurality of slice sections and at least a second address port coupled to receive an address from the slice controller of the slice section;
   wherein the slice controller is configured to simultaneously:
   transfer data between the corresponding NVM and the corresponding data slice store of the slice section, and transfer data between the corresponding data slice store of the slice section and the system memory bus.

8. The system of claim 7, further comprising:
   a master controller coupled between the module bus and the address and control portion of the system memory bus and configured to generate the address data on the module bus.

9. The system of claim 7, each of the memory modules further comprising:
   a master controller configured to map predetermined bus address values received on the system memory bus to addresses in the data slice store.

10. The system of claim 7, each of the memory modules further comprising:
    a slice communication channel to receive data from the slice controller.

11. The system of claim 10, each of the memory modules configured to generate at least one signal indicating a status of an access to the NVM based on signals received on the slice communication channel.

12. The system of claim 10, each of the memory modules configured to generate at least one signal indicating a status of accesses to the NVMs of each corresponding slice section based on signals received on the slice communication channel.

13. The system of claim 7, further comprising:
    a slave memory bus interface circuit corresponding to each slice section; and
    each slave memory bus interface circuit in communication with a master memory controller over a data portion of the system memory bus.

14. A method, comprising:
    receiving different portions of a multi-bit data value from a memory bus at different slice sections of a memory module;
    receiving an address value at a slice controller of each slice section, the address value corresponding to the multi-bit data value; and
    storing the portions of the multi-bit data value each in a different slice section of a nonvolatile memory (NVM) according to the address value;
    wherein storing the portions of the multi-bit data value includes caching each portion of the multi-bit value data in a data slice store of the corresponding slice section, and writing the portion of the multi-bit data value into the NVM corresponding to the slice section; and wherein storing the portions of the multi-bit data value includes, for each slice section, translating the address value into an NVM address based on an address translation table unique to the slice section;
    wherein the data slice store comprising a multi-port random access memory having at least a first address port coupled to receive address data from an address bus common to the plurality of slice sections and at least a second address port coupled to receive an address from a slice controller of the corresponding slice section;
    wherein the slice controller is configured to simultaneously:
    transfer data between the corresponding NVM and the corresponding data slice store of the slice section, and transfer data between the corresponding data slice store of the slice section and the system memory bus.

15. The method of claim 14, wherein storing the portions of the multi-bit data value includes, for each slice section, translating the address value into an NVM address based on an address translation table unique to the slice section.

16. The method of claim 14, further comprising:
    within each slice section, in response to predetermined address values, outputting at least some of the cached data as a portion of the multi-bit data value corresponding to the predetermined address.

17. The method of claim 14, further comprising:
    simultaneously:
    transferring data between a data slice store of the slice section and the memory bus; and
    accessing the NVM of the slice section with the slice controller of the slice section.

\* \* \* \* \*